(12) United States Patent
Deguchi

(10) Patent No.: US 8,762,671 B2
(45) Date of Patent: Jun. 24, 2014

(54) STORAGE APPARATUS AND ITS CONTROL METHOD

(75) Inventor: Makoto Deguchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 387 days.

(21) Appl. No.: 13/143,870

(22) PCT Filed: Jun. 28, 2011

(86) PCT No.: PCT/JP2011/003674
§ 371 (c)(1),
(2), (4) Date: Jul. 8, 2011

(87) PCT Pub. No.: WO2013/001568
PCT Pub. Date: Jan. 3, 2013

(65) Prior Publication Data
US 2013/0007339 A1    Jan. 3, 2013

(51) Int. Cl.
*G06F 12/00* (2006.01)
(52) U.S. Cl.
USPC .......................... 711/162; 711/113; 711/170
(58) Field of Classification Search
CPC  G06F 12/0866; G06F 11/1456; G06F 12/023
USPC ......................................... 711/113, 162, 170
See application file for complete search history.

(56) References Cited

U.S. PATENT DOCUMENTS

| | | | |
|---|---|---|---|
| 2005/0163014 A1 | 7/2005 | Soeda | |
| 2006/0212675 A1* | 9/2006 | Sartorius et al. | 711/205 |
| 2007/0174567 A1 | 7/2007 | Deguchi et al. | |
| 2009/0094430 A1* | 4/2009 | Bergheaud et al. | 711/163 |
| 2010/0115215 A1* | 5/2010 | Rosychuk | 711/162 |
| 2011/0078496 A1* | 3/2011 | Jeddeloh | 714/6.24 |

FOREIGN PATENT DOCUMENTS

JP   2007-199920 A   8/2007

OTHER PUBLICATIONS

PCT International Search Report and Written Opinion on application PCT/JP2011/003674 mailed Jan. 12, 2012; 9 pages.

* cited by examiner

*Primary Examiner* — Gurtej Bansal
(74) *Attorney, Agent, or Firm* — Foley & Lardner LLP

(57) ABSTRACT

To provide a storage apparatus and its control method capable of preventing degradation of sequential performance by making the page size of pages allocated to a duplicate of a logical volume an appropriate size.
A storage apparatus including a controller connected to a host system and a storage device connected to the controller, wherein the controller provides the host system with a logical volume, a duplicated volume which is a duplicate of the logical volume, and a snapshot volume for storing data to be saved by a snapshot; and a page(s) is allocated in a stripe unit of data size that can be read in response to one read command to the storage device when allocating the page(s) to the duplicated volume.

11 Claims, 33 Drawing Sheets

[SECURED PAGE SIZE SPECIFICATION
FROM EXTERNAL TERMINAL]

SECURED PAGE SIZE
MANAGEMENT TABLE

F I G . 14
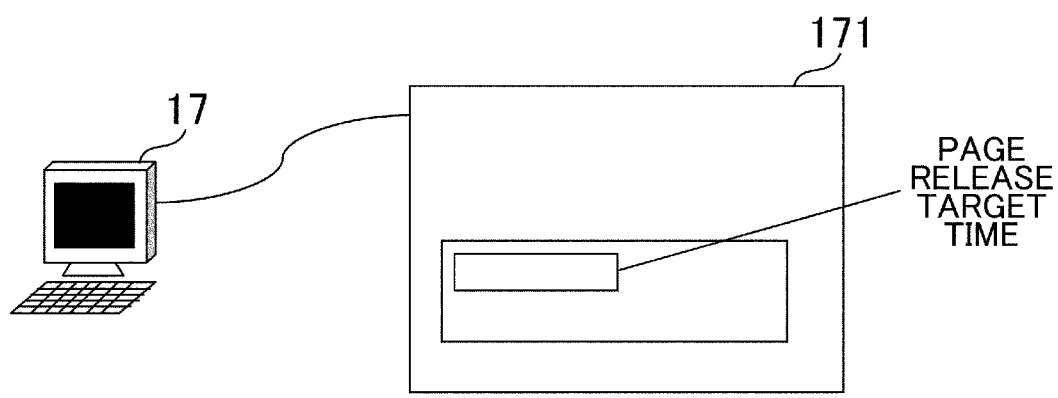

F I G . 16
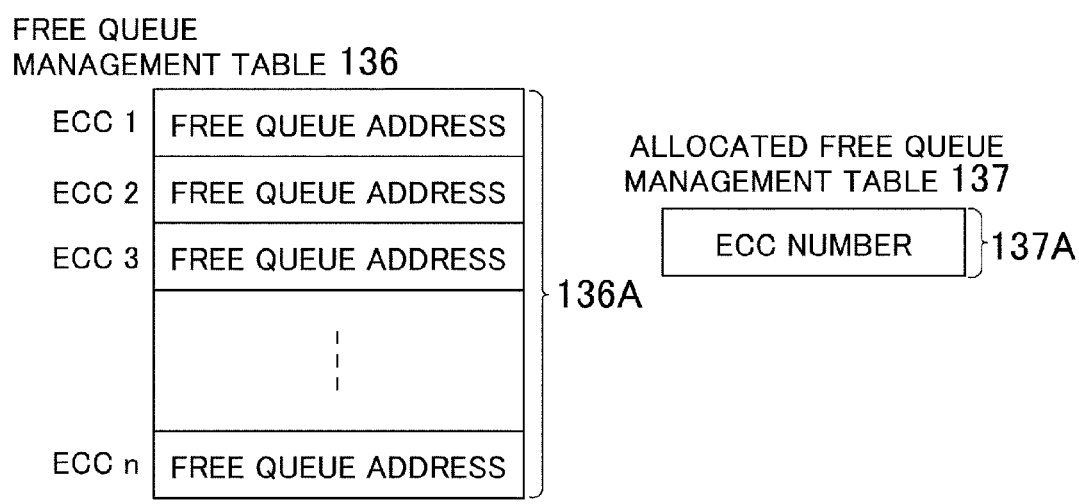

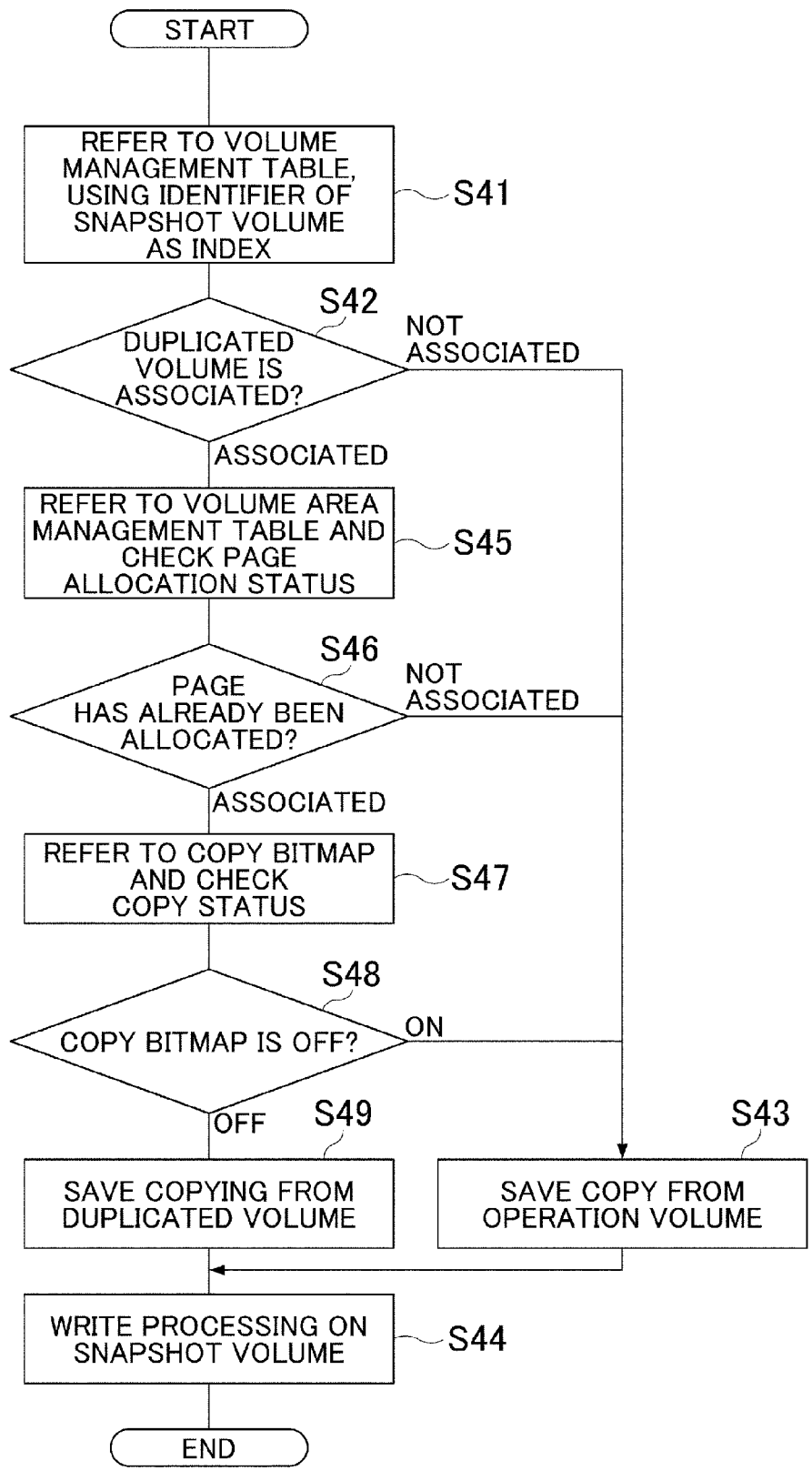

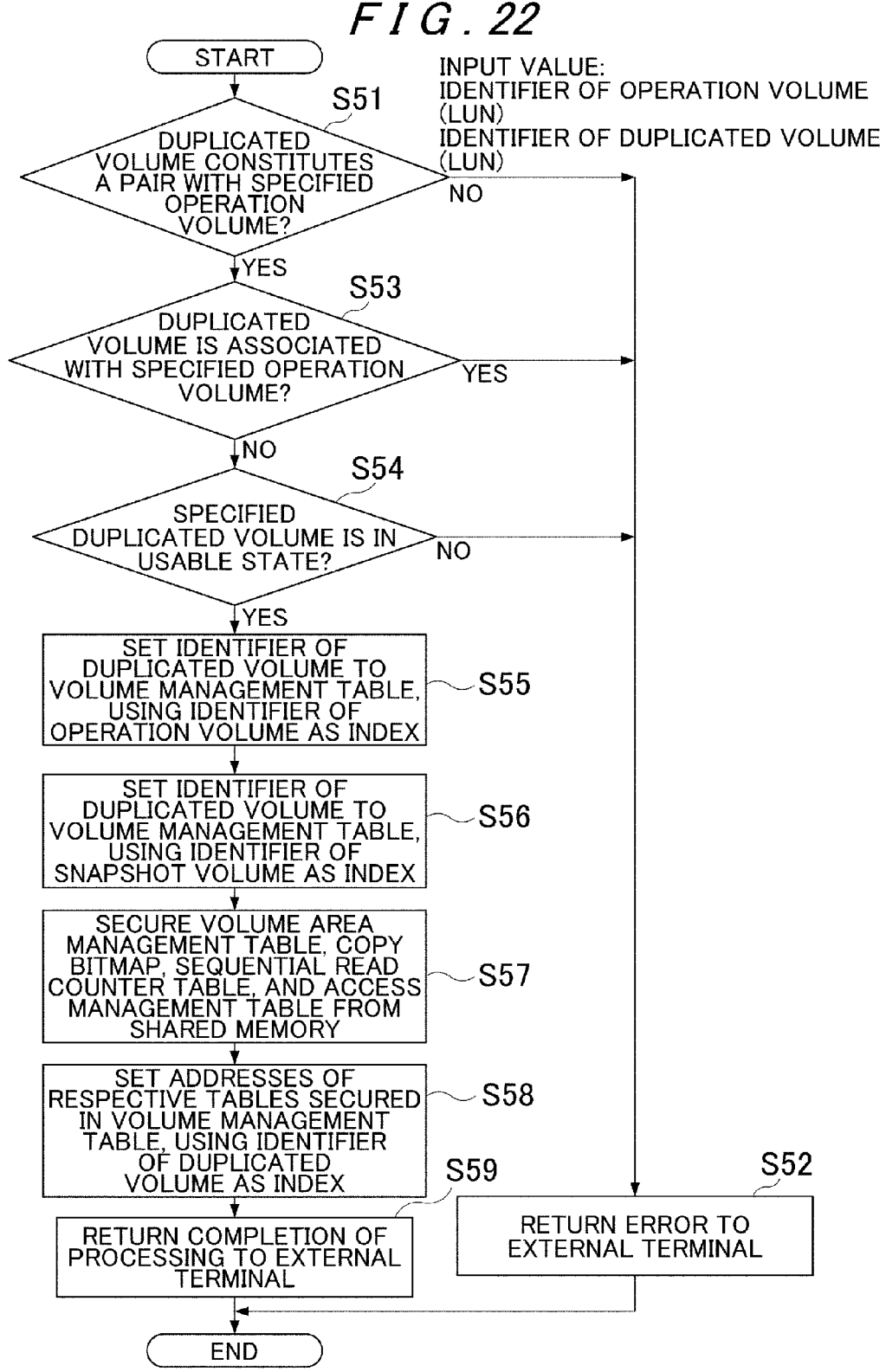

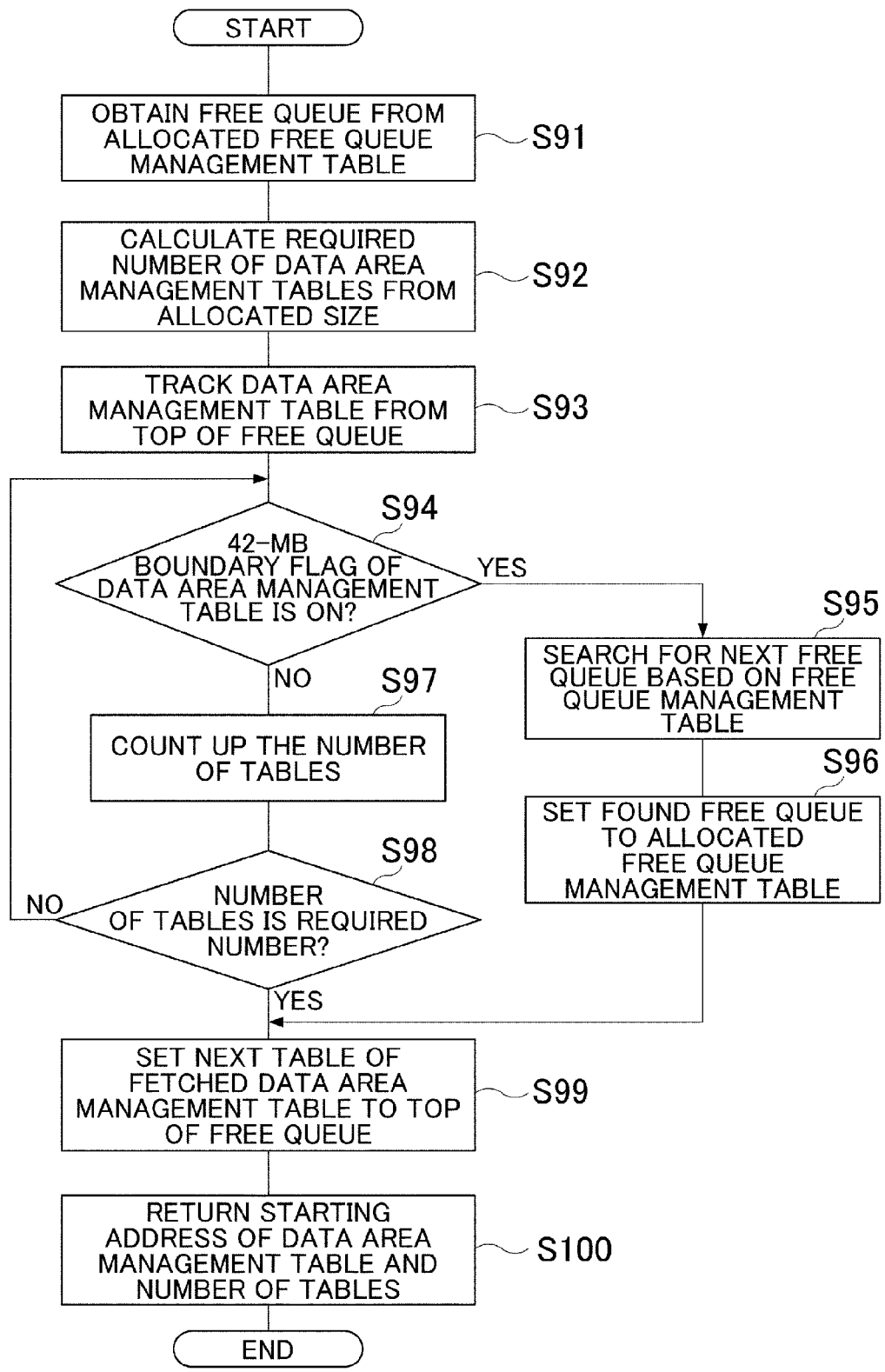

STORAGE APPARATUS AND ITS CONTROL METHOD

TECHNICAL FIELD

The present invention relates to a storage apparatus and its control method and is suited for use in, for example, a storage apparatus equipped with a snapshot function and a method for controlling such a storage apparatus.

BACKGROUND ART

Conventionally, a technology called "snapshots" is known as a method for extracting image data from a logical volume in operation at a certain point in time (hereinafter referred to as the "operation volume"). By means of this snapshot technology for example, when receiving a write request from a host system, the storage apparatus updates data in accordance with this write request after saving only pre-update data from the operation volume to another logical volume (hereinafter referred to as the "snapshot volume"). Subsequently, the storage apparatus updates the data in the operation volume based on the write request.

Therefore, the snapshot technology can achieve access to data at a plurality of certain points in time and further achieve such access by using small capacity.

Now, Patent Literature 1 discloses a storage apparatus and its control method for performing control so that if an access request is made to a snapshot volume to which data is saved by a snapshot, data which is not saved is obtained from a duplicate of the operation volume (hereinafter also referred to as the "duplicated volume"). Subsequently, Patent Literature 1 indicates that the acquisition of data from the operation volume as much data as obtained from the duplicated volume can be inhibited and the access load on the operation volume can be reduced.

CITATION LIST

Patent Literature

PTL 1: Japanese Patent Application Laid-Open (Kokai) Publication No. 2007-199920

SUMMARY OF INVENTION

Technical Problem

However, the page size of a page to be allocated to the duplicated volume is not considered at all for the storage apparatus and the control method disclosed in Patent Literature 1.

If the page size of a page to be allocated to the duplicated volume is not appropriate, inconvenience occurs in such cases where, for example, a sequential read access request is made to a snapshot volume and data is obtained from the duplicated volume. Specifically speaking, if data stored in a target page of sequential reading is scattered in a plurality of storage devices which are associated with the duplicated volume, it becomes necessary to make each of the plurality of storage devices operate appropriately and perform data reading by sequential reading. Therefore, the efficiency of the operation of the storage devices decreases and, as a result, a problem of degradation of the sequential performance is caused.

Therefore, the present invention was devised in consideration of the above-mentioned problem and aims at suggesting a storage apparatus and its control method capable of improving a read speed for snapshot volumes by setting a page size of pages to be allocated to the duplicated volume to an appropriate size and then allocating such pages.

Solution to Problem

In order to solve such problem, a storage apparatus according to the present invention includes a controller connected to a host system and a storage device connected to the controller, wherein the storage device provides pages, which are actual storage areas, to a logical volume created in the controller, a duplicated volume which is created in the controller and is a duplicate of the logical volume, and a snapshot volume created in the controller for storing data to be saved by a snapshot; wherein the controller provides the logical volume, the duplicated volume, and the snapshot volume to the host system; and wherein when allocating the pages provided by the storage device to the duplicated volume, the controller allocates the pages in a stripe unit of a data size that can be read by one read command, to the storage device.

Furthermore, the present invention provides a method for controlling a storage apparatus including a controller connected to a host system and a storage device connected to the controller, wherein the storage apparatus control method includes: a first step executed by the storage device providing pages, which are actual storage areas, to a logical volume created in the controller, a duplicated volume which is created in the controller and is a duplicate of the logical volume, and a snapshot volume created in the controller for storing data to be saved by a snapshot; a second step executed by the controller providing the logical volume, the duplicated volume, and the snapshot volume to the host system; and a third step executed, when allocating the pages provided by the storage device to the duplicated volume, by the controller allocating the pages in a stripe unit of a data size that can be read by one read command, to the storage device.

Advantageous Effects of Invention

According to the present invention, the read speed for the snapshot volume can be improved by setting the page size of pages to be allocated to the duplicated volume to an appropriate size and allocating such pages.

BRIEF DESCRIPTION OF DRAWINGS

FIG. 14 is a configuration diagram showing a setting screen of page release target time.

FIG. 16 is a conceptual diagram showing a free queue management table.

FIG. 21 is a flowchart showing write processing on a snapshot.

FIG. 22 is a flowchart showing duplicated volume association processing.

FIG. 24 is a flowchart showing page allocation processing.

DESCRIPTION OF EMBODIMENTS

An embodiment of the present invention will be explained below in detail with reference to the attached drawings.

(1) Hardware Configuration of Storage System 1

Figure 1:
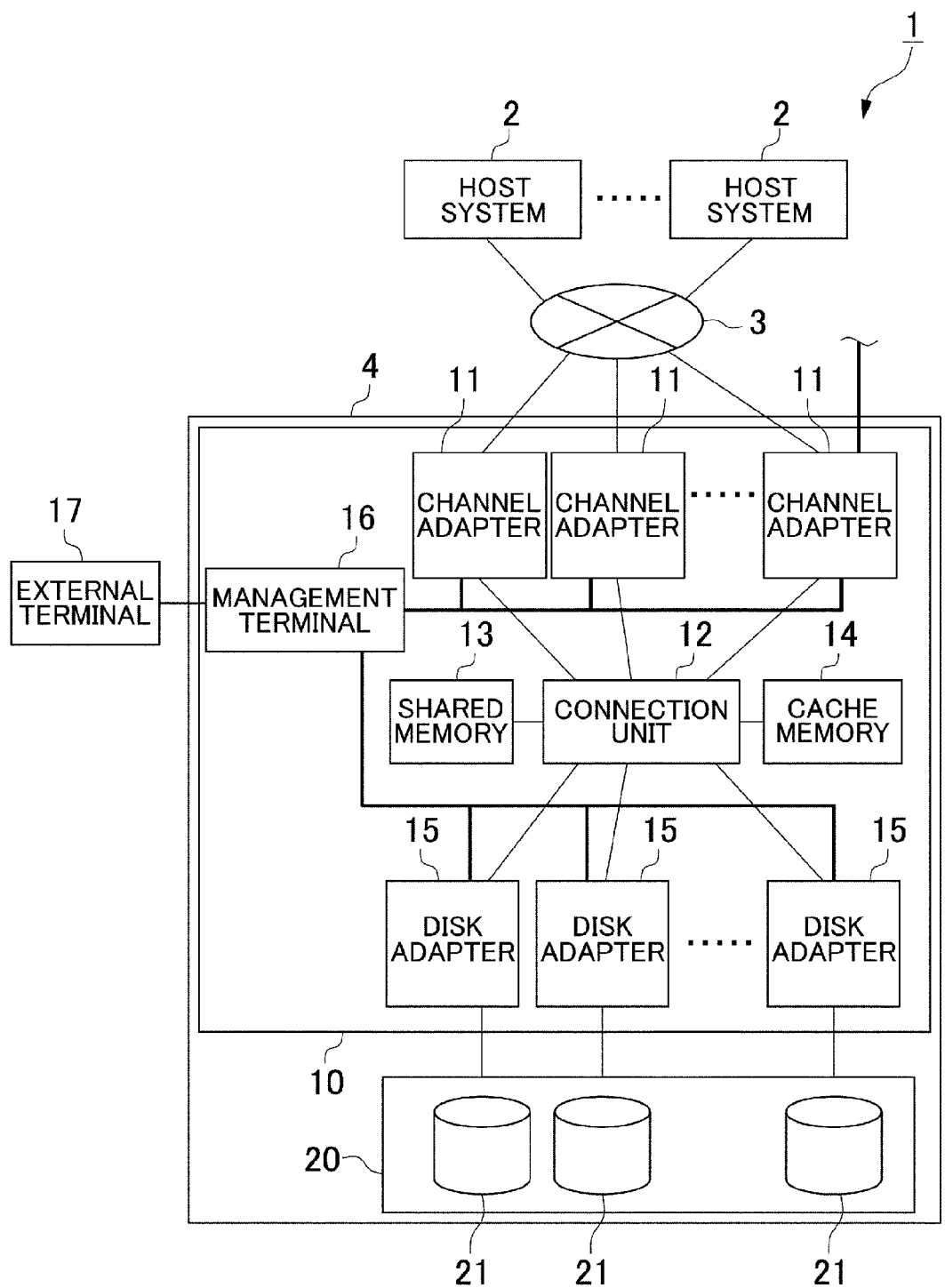
FIG. 1 is a conceptual diagram showing a hardware configuration of a storage system.

FIG. 1 shows a hardware configuration of a storage system 1. This storage system 1 includes a plurality of host systems 2, a network 3, and a storage apparatus 4. Subsequently, the plurality of host systems 2 and the storage apparatus 4 are connected via the network 3.

The host system 2 are computer apparatuses equipped with information processing resources such as CPUs (Central Processing Units) and memories, information input resources such as keyboards and pointing devices, and information output resources such as monitor displays and speakers; and are, for example, personal computers, work stations, or mainframe computers. It should be noted that the host system 2 assumes a role as a higher-level device.

The network 3 is composed of, for example, a SAN (Storage Area Network), a LAN (Local Area Network), the Internet, a public line, or a private line. For example, if this network 3 is a SAN, communication between the host systems 2 and the storage apparatus 4 is performed in accordance with a Fibre Channel protocol. Meanwhile, if the network 3 is a LAN, communication between the host systems 2 and the storage apparatus 4 is performed in accordance with a TCP/IP protocol (Transmission Control Protocol/Internet Protocol).

The storage apparatus 4 includes a controller 10 and a storage device 20 and controls data input/output processing and storage processing.

The controller 10 includes a plurality of channel adapters 11, a connection unit 12, a shared memory 13, a cache memory 14, a plurality of disk adapters 15, a management terminal 16, and an external terminal 17.

The channel adapter 11 includes, for example, a microprocessor, a memory, and a communication interface and is configured as a microcomputer system. Furthermore, the channel adapter 11 is equipped with ports for connection to, for example, the network 3 and other storage systems, interprets various types of commands transmitted from the host system 2 via the network 3, and executes corresponding processing. The port of each channel adapter 11 is assigned a network address (e.g. an IP address or a WWN) for identifying that port, by which each channel adapter 11 can operate individually as a NAS (Network Attached Storage).

The connection unit 12 is connected to the channel adapter s11, the shared memory 13, the cache memory 14, and the disk adapters 15. The channel adapters 11, the shared memory 13, the cache memory 14, and the disk adapters 15 send/receive data and commands between them via this connection unit 12. The connection unit 12 is composed of, for example, a switch or a bus, such as a very high-speed cross bus switch for transmitting data by means of high-speed switching.

The shared memory 13 and the cache memory 14 are storage memories shared by the channel adapters 11 and the disk adapters 15. The shared memory 13 is mainly used to store system configuration information related to the entire storage apparatus 4, various types of programs, various types of tables, and commands such as write requests and read requests. Furthermore, the cache memory 14 is mainly used to temporarily store write target data and read target data to be input to and/or output from the storage apparatus 4.

The disk adapter 15 includes, for example, a microprocessor and a memory and is configured as a microcomputer system. Furthermore, the disk adapter 15 functions as an interface performing protocol control when communicating with the disk devices 21 in the storage device 20. The disk adapter 15 is connected to a corresponding disk device 21 in the storage device 20, for example, via a Fibre Channel cable and sends/receives data to/from the disk devices 21 in accordance with the Fibre Channel protocol.

The management terminal 16 is a terminal device for controlling the operation of the entire storage apparatus 4 and is composed of, for example, a notebook personal computer. The management terminal 16 is connected to the respective channel adapters 11 via the LAN 17 respectively, and is connected to the respective disk adapters 15A via the LAN 18 respectively. The management terminal 16 can define the system configuration information as operated by an operator and can also store this defined system configuration information in the shared memory 13 via the channel adapters 11 or the disk adapters 15, and the connection unit 12.

The external terminal 17 is connected to the storage apparatus 4 via, for example, a LAN. The external terminal 17 is a terminal device for controlling the operation of the entire storage apparatus 4 and is composed of, for example, a notebook personal computer. Furthermore, the external terminal 17 can view and set the system configuration information in the same manner as the management terminal 16.

The storage device 20 is composed of a plurality of disk devices 21. For example, expensive disks such as SCSI (Small Computer System Interface) disks or inexpensive disks such as SATA (Serial AT Attachment) disks and optical disks can be used as the plurality of disk devices 21.

(2) Logical Configuration of Storage System 1

Figure 2:
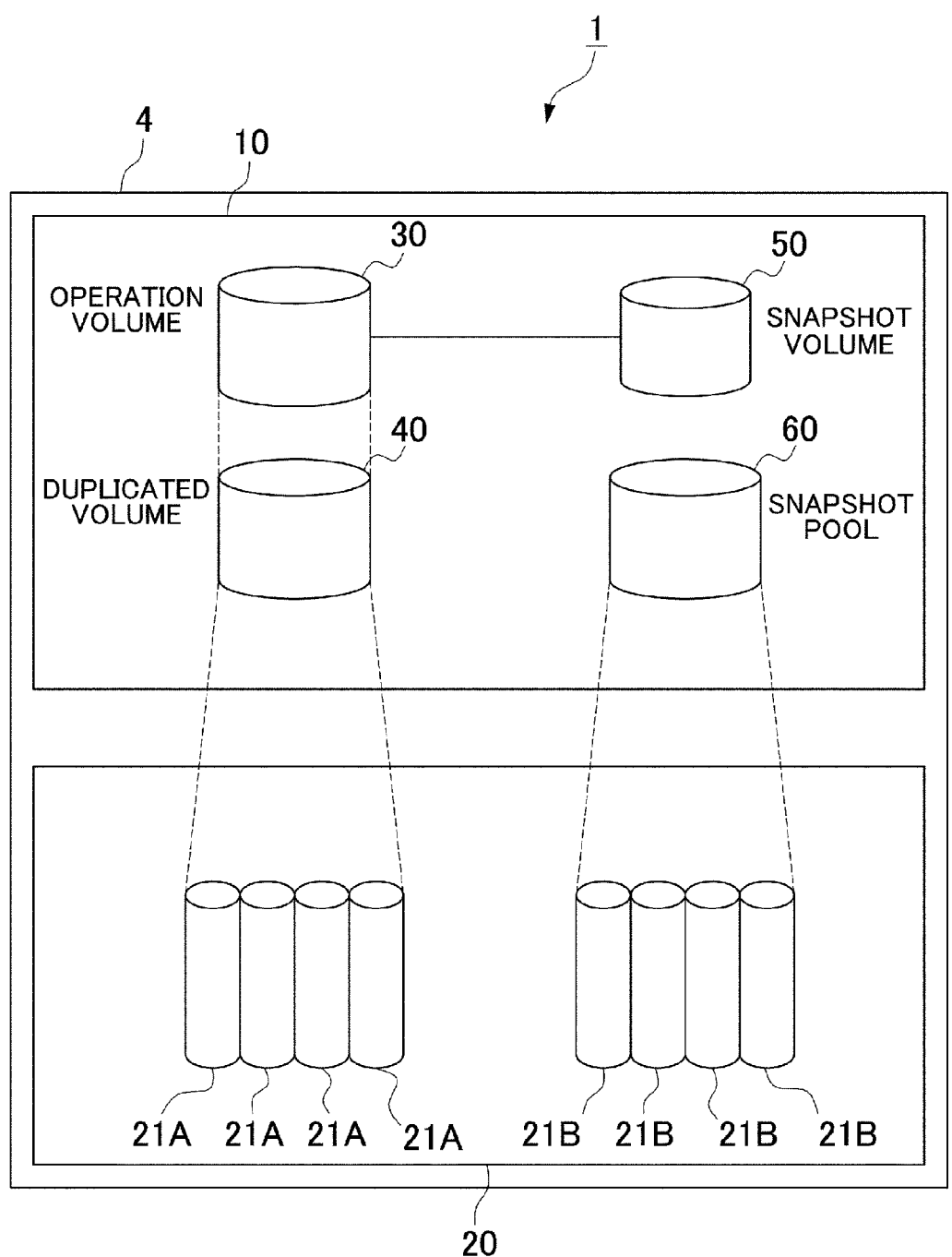
FIG. 2 is a conceptual diagram showing a logical configuration of the storage system.

FIG. 2 shows a logical configuration of the storage system. The storage system 1 includes an operation volume 30, a duplicated volume 40, a snapshot volume 50, and a snapshot pool 60 in the controller 10.

The operation volume 30 is a logical volume which stores data transmitted from the host system 2 in response to write requests from the host system 2.

It should be noted that a logical volume is assigned a unique identifier (an LUN: Logical Unit Number). Furthermore, the inside of the logical volume is composed of logical blocks partitioned by a specified size of blocks. Also, each logical block is assigned a unique number (an LBA: Logical Block Address). The host system 2 can make a read request or write request to a desired logical volume by using a combination of these LUN and LBA as an address.

The attributes of logical volumes include a virtual volume which accepts an access request from the host system 2, and a real volume associated with this virtual volume. A storage area of the real volume is associated with an actual storage area of the disk devices 21. The real volume is composed of a plurality of pool areas, and each of the pool areas is composed of a plurality of pool volumes. For example, the FIG. 3 explained later shows that four pool volumes PVOLs (disk devices 21) constitute one pool area ECC1. The operation volume 30, which accepts access requests from the host system 2, is a virtual volume among the logical volumes.

Furthermore, storage areas in volumes which are virtual volumes and real volumes are partitioned into storage areas called "slots." Furthermore, the virtual volumes and the real volumes are associated with each other in slot units. A slot is a minimum storage area for storing data and corresponds to the aforementioned logical block.

The duplicated volume 40 is a logical volume, which is a duplicate of the operation volume 30, and is a virtual volume. Furthermore, the duplicated volume 40 is associated with the operation volume 30 in slot units.

The snapshot volume 50 is a logical volume which stores only pre-update data when data in the operation volume 30 is updated; and the snapshot volume 50 is a virtual volume. Furthermore, the snapshot volume 50 is associated with the operation volume 30 and the duplicated volume 40 in slot units.

It should be noted that the technology of saving only the pre-update data to the snapshot volume 50 before updating the data when the data is updated in the operation volume 30 as explained above is called a snapshot technology.

The capacity efficiency can be enhanced by saving data by this snapshot technology. Specifically, for example, when the operation volume 30 is updated at a plurality of points in time, a snapshot volume 50 is created at each of such points in time, and the pre-update data is saved to each of the snapshot volumes 50, the capacity efficiency can be improved.

The snapshot pool 60 is a logical volume, which stores data stored in one or more snapshot volumes 50, and is a real volume. The pair setting of the snapshot pool 60 is set to one or more snapshot volumes 50 and the snapshot pool 60 is associated with actual storage areas provided by the plurality of disk devices 21.

(3) Data Flow Between Respective Logical Volumes

Figure 3:
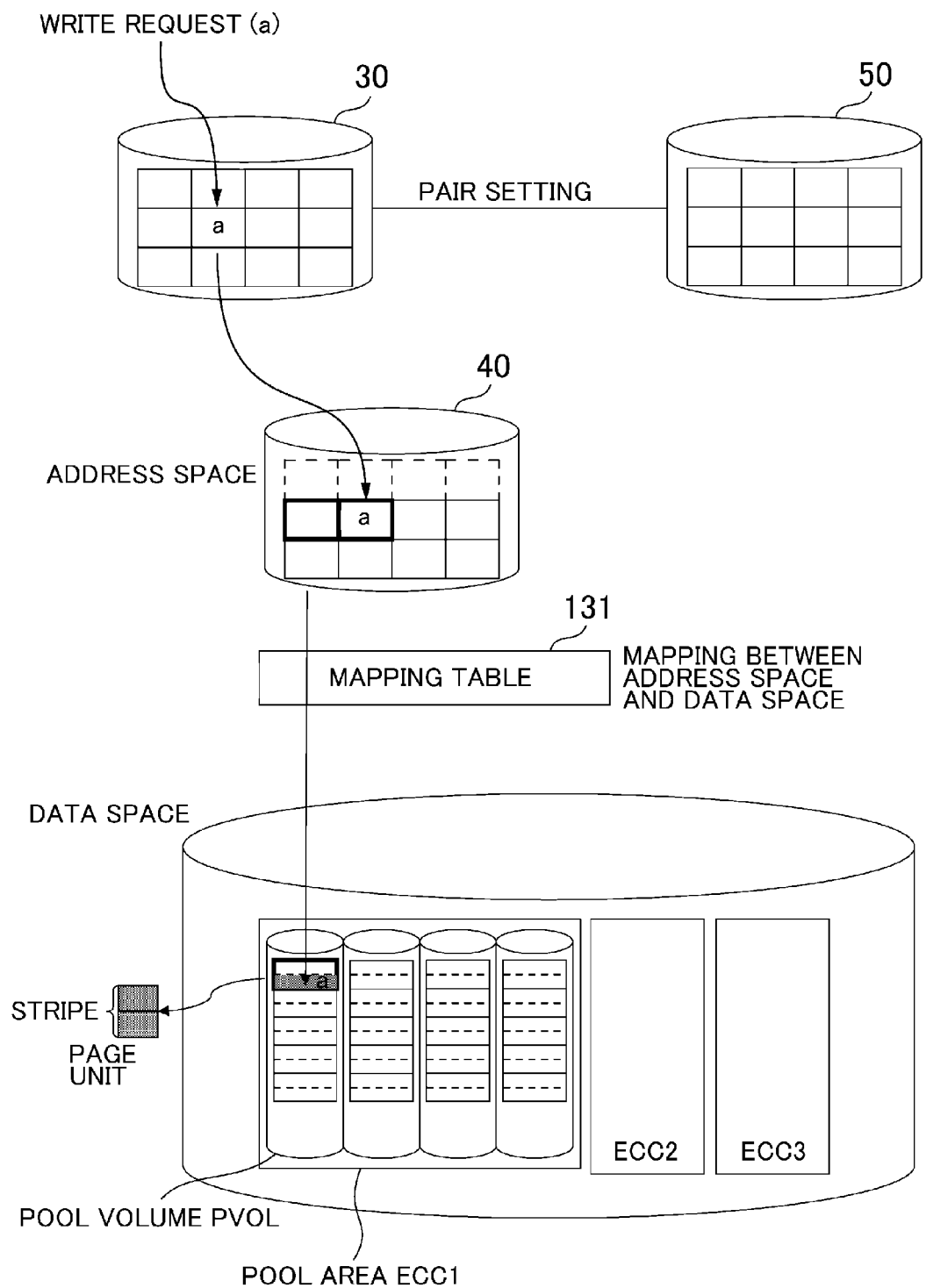
FIG. 3 is a conceptual diagram showing a data flow of new data writing to an operation volume.

FIG. 3 is a conceptual diagram showing a data flow between the respective logical volumes when a new write request is made to the operation volume 30.

FIG. 3 shows that data "a" is stored in a storage area of the operation volume 30 in accordance with the new write request from the host system 2. Furthermore, FIG. 3 shows that the data "a" is also stored at the same position in the duplicated volume 40 which is a duplicate of the operation volume 30.

When the data "a" is stored in the duplicated volume 40, a storage area called a "page" is allocated from one pool volume PVOL (disk device 21) in one pool area ECC1 to the duplicated volume 40.

A "page" is a data read/write unit for logical volumes.

In this embodiment, the page size of a "page" which is then allocated is not set by the "slot" size which is the minimum size as the data read/write unit for logical volumes, but is set by a size called a "stripe."

A "stripe" represents a data read/write unit for the disk devices 21.

Specifically speaking, in this embodiment, the page size which is allocated to the duplicated volume 40 is supposed to be the stripe size which is the data read/write unit for the disk devices 21. It should be noted that the relationship between the stripe size and the slot size is that one stripe is equal to two slots. Therefore, in this embodiment, the page size allocated to the duplicated volume 40 is larger than the page size of the conventional slot size.

Data can be read by a small number of read commands and the operation efficiency of the disk devices 21 can be improved as explained above by using the stripe size, which is a data size read by one read command, instead of the slot size, as the page size to be allocated to the duplicated volume 40. Furthermore, for example, if the access request from the host system 2 is for sequential data reading by which sequential data is handled, sequential performance can be improved. Specifically speaking, if sequential data reading is performed, sequentially allocated slots are read in the operation volume 30 or the snapshot volume 50. Therefore, with the duplicated volume 40, sequential slots can be secured with more certainty and the number of read commands can be reduced by allocation in stripe units, by which it is highly possible that all the slots might be sequentially allocated, rather than by allocation in slot units by which all the slots might be allocated in a scattered manner. As a result, the sequential performance can be improved.

It should be noted that reference is made to a table called a "mapping table" 131 with respect to association between the position of a storage area (address space) in the duplicated volume 40 and the position of a storage area (data space) in the disk devices 21. This mapping table 131 is one of various types of tables stored in the shared memory 13 and its details will be explained later.

Figure 4:
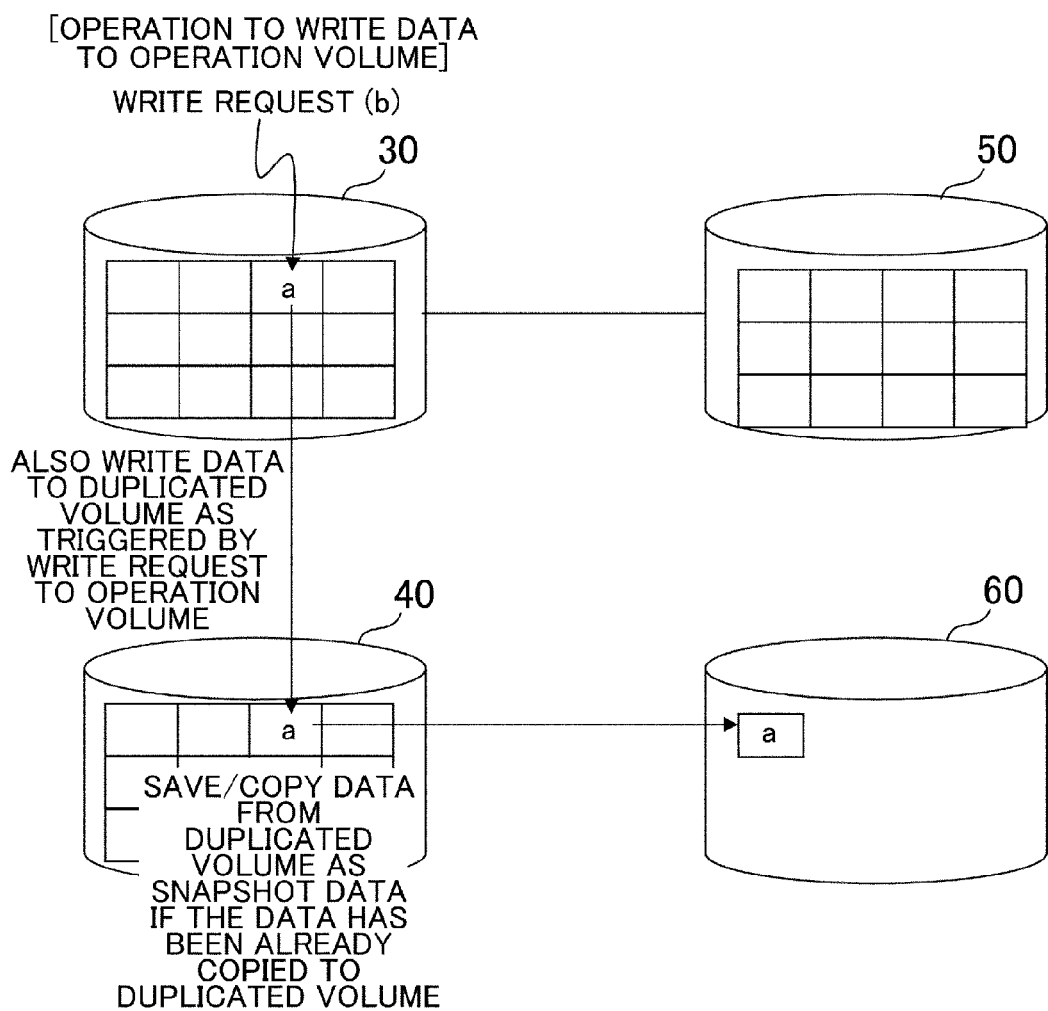
FIG. 4 is a conceptual diagram showing a data flow of update data writing to the operation volume.

FIG. 4 is a conceptual diagram showing a data flow between the respective logical volumes when an update write request is made to the operation volume 30.

FIG. 4 shows that data "a" is stored in a storage area of the operation volume 30 before an update write request is made. Furthermore, FIG. 4 shows that the data "a" is also stored at the same position in the duplicated volume 40 which is a duplicate of the operation volume 30. Furthermore, FIG. 4 shows that the update write request to write data "b" to a storage area at the same position as the storage area, where the data "a" is stored, is made to the operation volume 30 from the host system 2.

In this case, according to this embodiment, the data "a" which is data before update writing is saved from the duplicated volume 40 to the snapshot pool 60 as triggered by the update write request to the operation volume 30. Therefore, the data "a" which is the data before the update write request will be stored in the snapshot pool 60. Subsequently, the data "b" is supposed to be stored in the operation volume 30 and in the duplicated volume 40 in accordance with the update write request from the host system 2 and the data will be updated.

Figure 5:
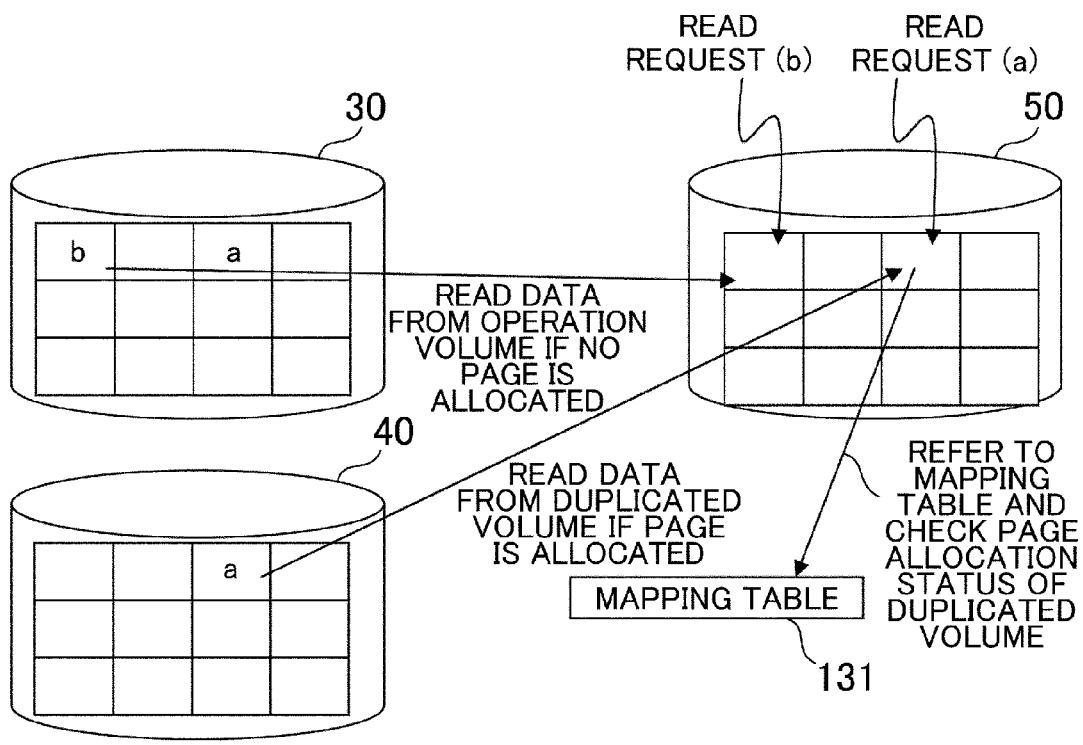
FIG. 5 is a conceptual diagram showing a data flow of data reading to a snapshot.

FIG. 5 is a conceptual diagram showing a data flow between the respective logical volumes when a read request is made to the snapshot volume 50.

FIG. 5 shows that the data "a" and "b" are stored in the storage area of the operation volume 30 before a read request is made. Furthermore, FIG. 5 shows that the data "a" is also stored at the same position in the duplicated volume 40 which is a duplicate of the operation volume 30. Furthermore, FIG. 5 shows that the read request is made from the host system 2 to the snapshot volume 50 to read these pieces of data "a" and "b."

In this case, according to this embodiment, whether or not the data "a" and "b" which are targets of the read request are stored in the duplicated volume 40 which is the duplicate of the operation volume 30 or not is firstly checked. Reference is made to the mapping table 131 in order to perform the check. Incidentally, the mapping table 131 will be explained later.

It is found as a result of the check that the data "a" is stored in the duplicated volume 40 in this example, so that the data "a" will be read from the duplicated volume 40. Meanwhile, since the data "b" is not stored in the duplicated volume 40, it will be read from the operation volume 30.

Figure 6:
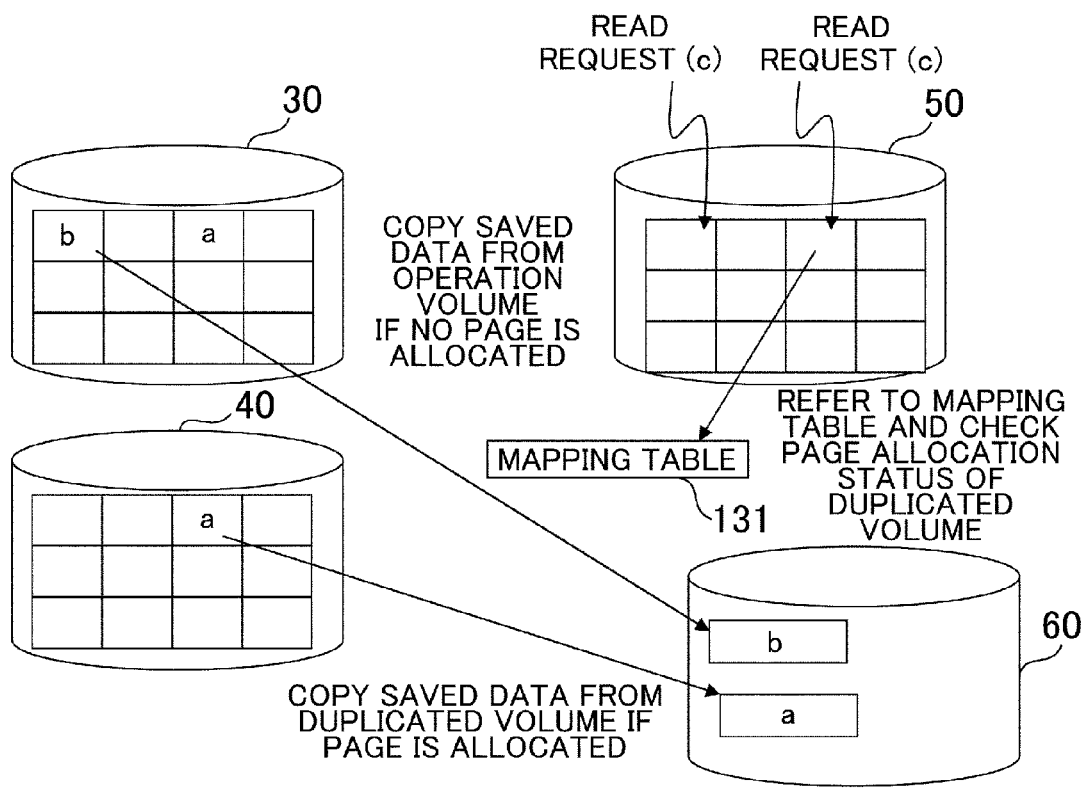
FIG. 6 is a conceptual diagram showing a data flow of data writing to a snapshot.

FIG. 6 is a conceptual diagram showing a data flow between the respective logical volumes when an update write request is made to the snapshot volume 50.

FIG. 6 shows that the data "a" and "b" are stored in the storage area of the operation volume 30 before an update write request is made. Furthermore, FIG. 6 shows that the data "a" is also stored at the same position in the duplicated volume 40 which is a duplicate of the operation volume 30. Furthermore, FIG. 6 shows that an update write request is made from the host system 2 to the snapshot volume 50 to write data "c" to the storage area at the same position as the storage area where the data "a" and "b" are stored.

In this case, according to this embodiment, whether or not the data before the update writing is stored or not in the storage area at the same position as the position to which the data "c", that is, the target of the update write request, is written is firstly checked. Reference is made to the mapping table 131 in order to perform the check. Incidentally, this mapping table 131 will be explained later.

It is found as a result of the check that the data "a" which is the data before the update write is stored in the duplicated volume 40, so that the data "a" will be saved from the duplicated volume 40 to the snapshot pool 60. Furthermore, since the data "b" which is the data before the update writing is not stored in the duplicated volume 40, it will be saved from the operation volume 30 to the snapshot pool 60.

(4) Association between Respective Logical Volumes

Figure 7:
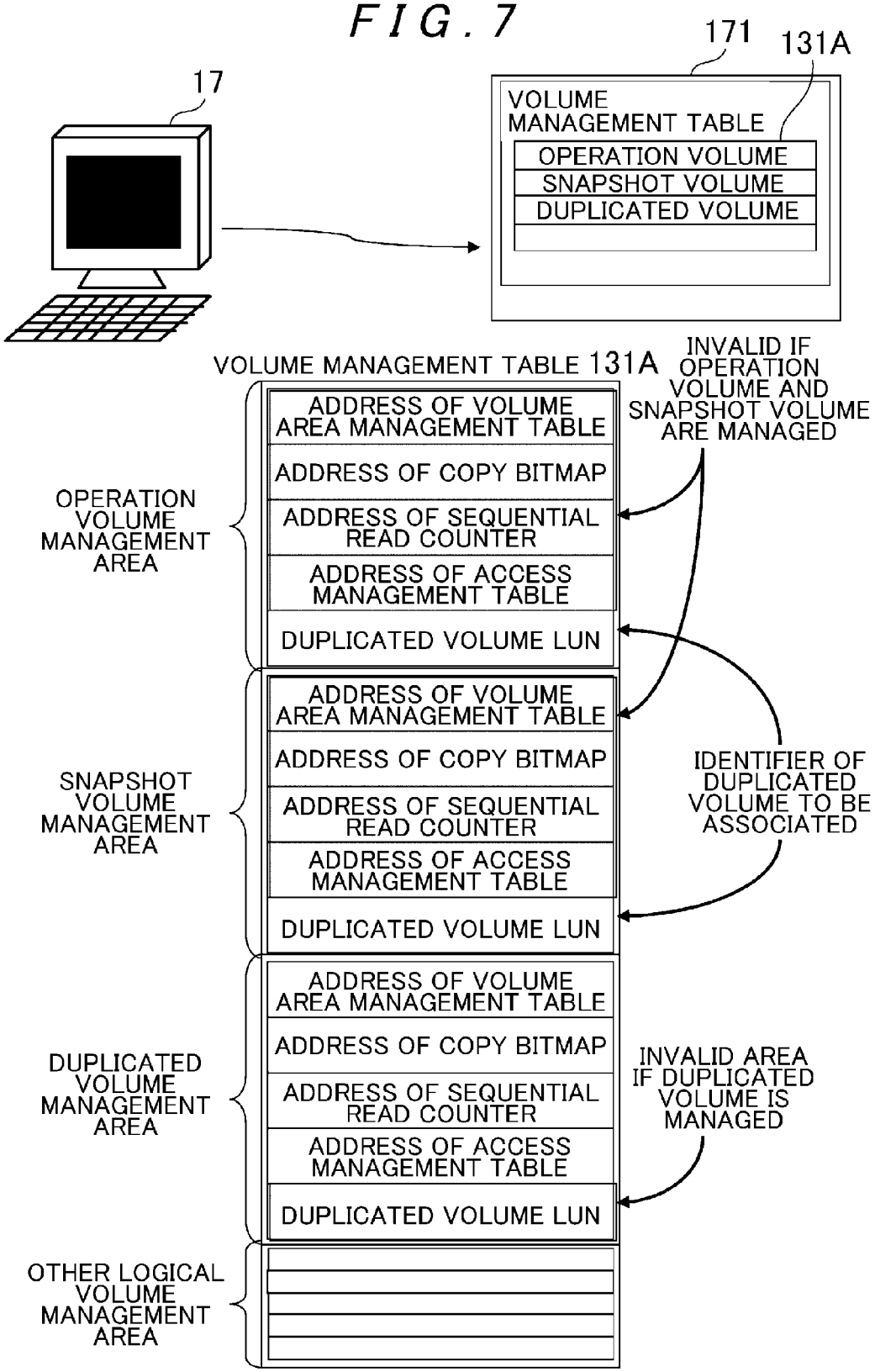
FIG. 7 is a conceptual diagram showing the overview and setting items of association performed from an external terminal.

FIG. 7 shows a setting screen 171 on the external terminal 17 and items of a volume management table 131A, which will be set on this setting screen 171.

The volume management table 131A for managing the respective logical volumes of the operation volume 30, the snapshot volume 50, and the duplicated volume 40 is displayed on the setting screen 171 of the external terminal 17. A user can set the setting of the volume management table 131A and associate the logical volumes with each other in the volume management table 131A by operating the external terminal 17.

With the volume management table 131A, only an "LUN of Duplicated Volume" can be set with respect to an area where the operation volume 30 and the snapshot volume 50 are managed. Furthermore, with the volume management table 131A, items other than the "LUN of Duplicated Volume," that is, an "Address of Volume Area Management table," an "Address of Copy Bitmap," an "Address of Sequential Read Counter," and an "Address of Access Management Table," can be set with respect to an area where the duplicated volume 40 is managed.

(5) Configuration of Mapping Table

Figure 8:
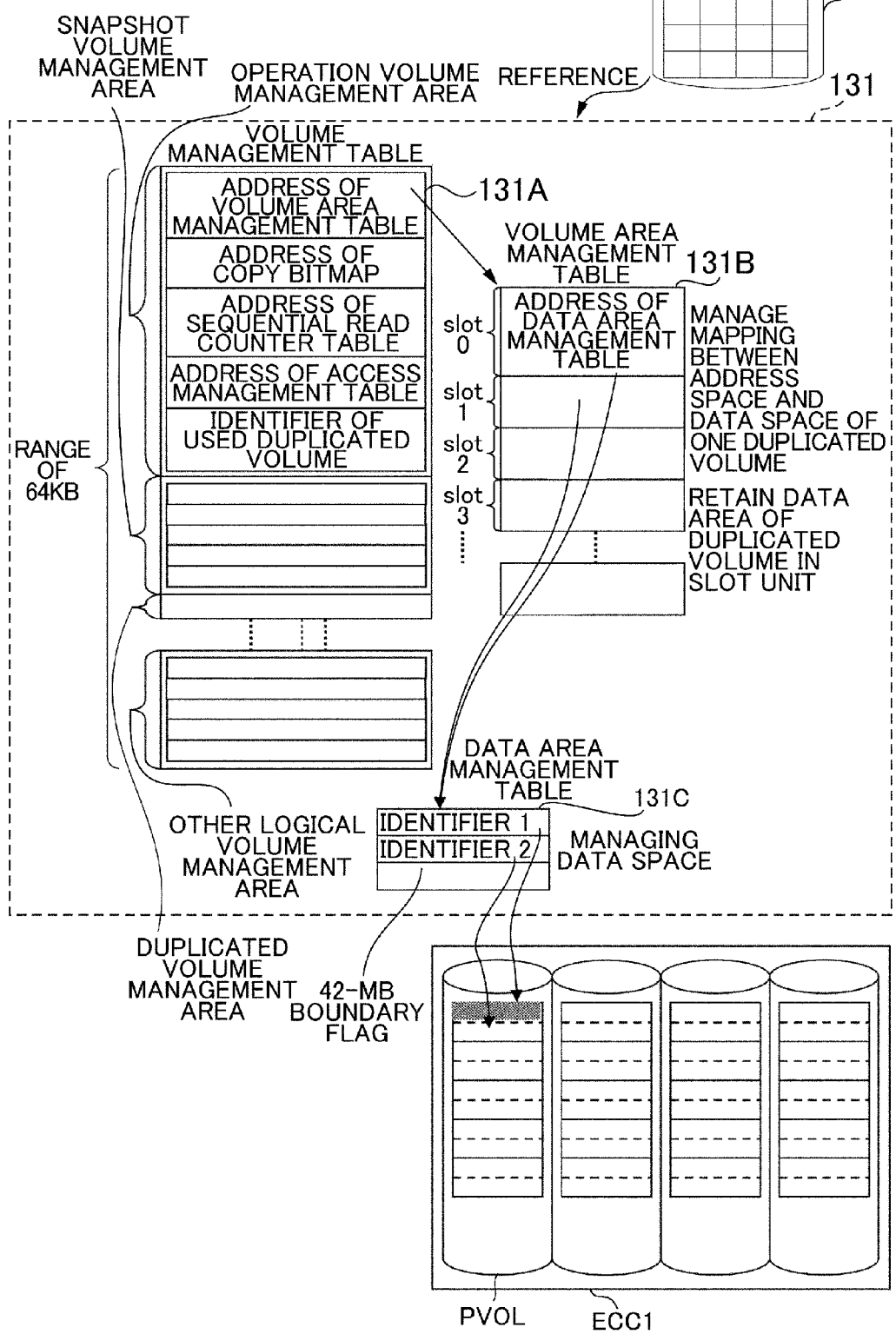
FIG. 8 is a conceptual diagram showing mapping between an address space and a data space.

FIG. 8 is a conceptual diagram showing a flow of mapping between an address space and a data space and shows the mapping table 131.

Reference is made to the mapping table 131 when associating the position of a storage area (address space) in the duplicated volume 40 with the position of a storage area (data space) in the disk devices 21.

Furthermore, the mapping table 131 is constituted from a volume management table 131A, a volume area management table 131B, and a data area management table 131C.

The volume management table 131A is used to manage each logical volume provided by the storage apparatus 4. Incidentally, FIG. 8 shows that the volume management table 131A in this example manages three logical volumes, that is, the operation volume 30, the duplicated volume 40, and the snapshot volume 50; however, the configuration of this table is not limited to this example, and the volume management table 131A may be configured so that it can manage a plurality of logical volumes, but only within the range of 64 kilobytes.

Furthermore, the address of the volume area management table 131B, the address of the copy bitmap, the address of the sequential read counter, the address of the access management table, and the identifier (LUN) of the duplicated volume are stored in the volume management table 131A as information for managing the respective logical volumes.

Furthermore, the volume area management table 131B from among those listed above is used to manage storage areas in the duplicated volume 40 in slot units and is actually used to manage the addresses of the data area management table 131C in slot units. Therefore, the address of the data area management table 131C is stored in the volume area management table 131B in slot units.

Furthermore, the data area management table 131C is used to manage the storage areas in the duplicated volume 40 in stripe units, and is actually used to manage the position of a storage area of two slots in the disk devices 21. Therefore, information of a one-stripe data space is stored in the data area management table 131C.

Furthermore, a "42-MB boundary flag" is stored in the data area management table 131C. This 42-MB boundary flag is used to store data in a scattered manner in the storage device 20; and, in fact, if 42-MB data is stored in the first pool area ECC1, another 42-MB data will then be stored in the second pool area ECC2 which is different from the first pool area ECC1. As explained above, the operation efficiency of the storage device 20 can be improved by storing data in units of 42 MB in a scattered manner in the storage device 20.

(6) Data Copy from Operation Volume 30 to Duplicated Volume 40

Figure 9:
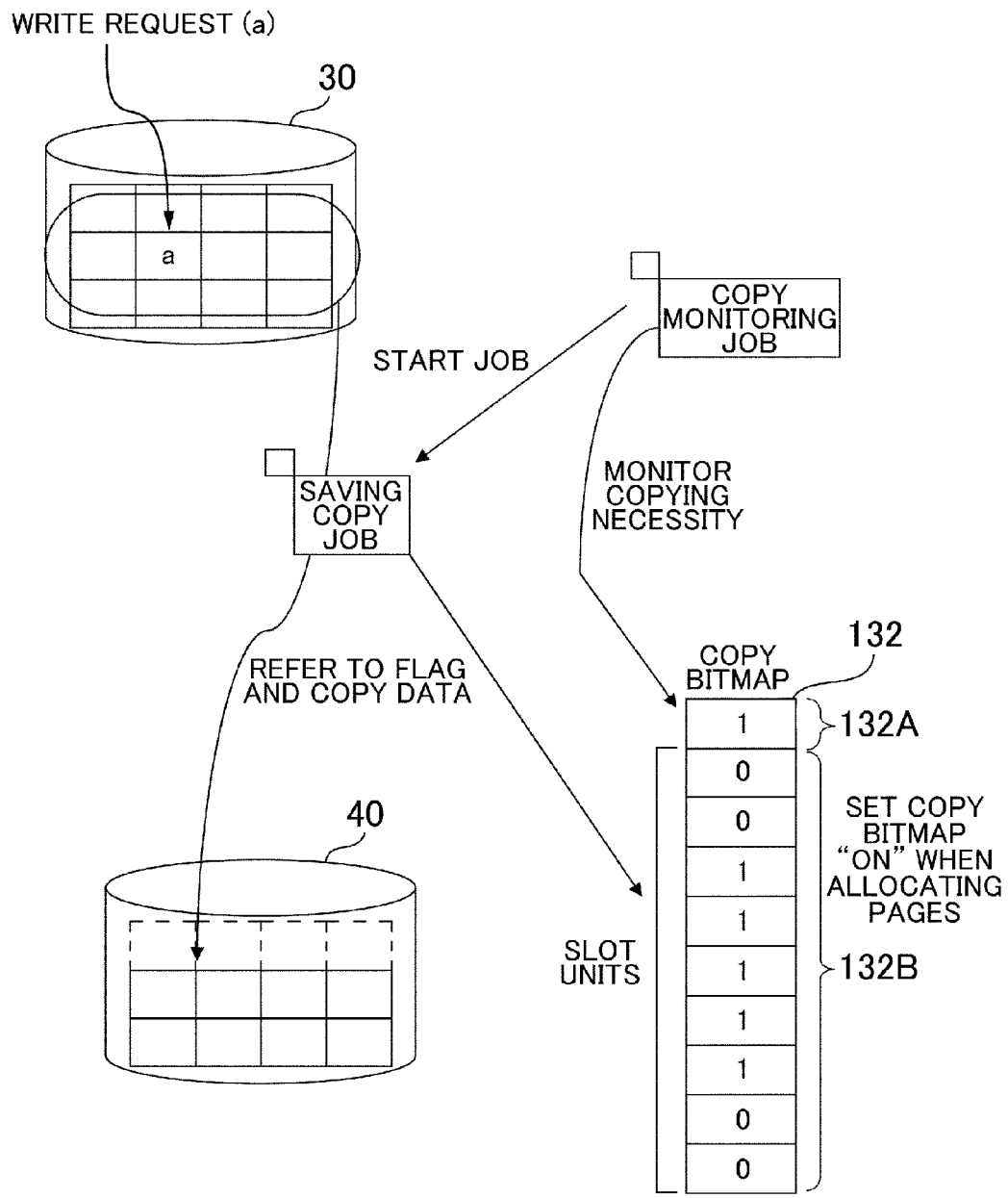
FIG. 9 is a conceptual diagram showing background copying to a duplicated volume.

FIG. 9 shows the overview of background data copying to the duplicated volume 40 when a write request is made to the operation volume 30.

The copy bitmap 132 is used to determine whether data copying from the operation volume 30 to the duplicated volume 40 is necessary or not; and if data copying to the duplicated volume 40 is necessary, the copy bitmap 132 is also used to determine copying of data stored in which slot is necessary from among data in the operation volume 30.

Furthermore, the copy bitmap 132 constituted from a first copy necessity flag field 132A and a second copy necessity flag field 132B.

The first copy necessity flag field 132A stores a copy necessity flag indicating whether data copying from the operation volume 30 to the duplicated volume 40 is necessary or not. If copying is necessary, a copy necessity flag "1" is set (ON); and if copying is not necessary, a copy necessity flag "0" is set (OFF). Furthermore, the copy necessity flag "1" is set as triggered by a write request made to the operation volume 30.

Furthermore, the second copy necessity flag field 132B stores a copy necessity flag indicating whether data copying from the operation volume 30 to the duplicated volume 40 in slot units in the duplicated volume 40 is necessary or not. Furthermore, either of the copy necessity flags "1" and "0" is set at the time of page allocation to the duplicated volume 40.

Therefore, as "1" is set to the first copy necessity flag field 132A in the case of FIG. 9, it shows that data copying from the operation volume 30 to the duplicated volume 40 is necessary. Furthermore, "0," "0," "1," "1" and so on and then "1," "0," "0" are set to the second copy necessity flag field 132B, it shows that copying is not necessary for the first two slots in the operation volume 30, copying is necessary for the following five slots, and copying is not necessary for the following two slots.

This copy bitmap 132 is regularly monitored by a "copy monitor job" which is one of the programs stored in the shared memory 13, and the "copy job" which is one of the programs stored in the shared memory 13 is started by the copy monitor job if the flag "1" is set to the first copy necessity flag field 132A.

Subsequently, the started copy job refers to the second copy necessity flag field 132B of the copy bitmap 132, judges the necessity of copying in slot units, and then copies data corresponding to the slots of the copy necessity flag "1" in the second copy necessity flag field 132B from the operation volume 30 to the duplicated volume 40.

(7) Sequential Reading for Snapshot Volume 50

Figure 10:
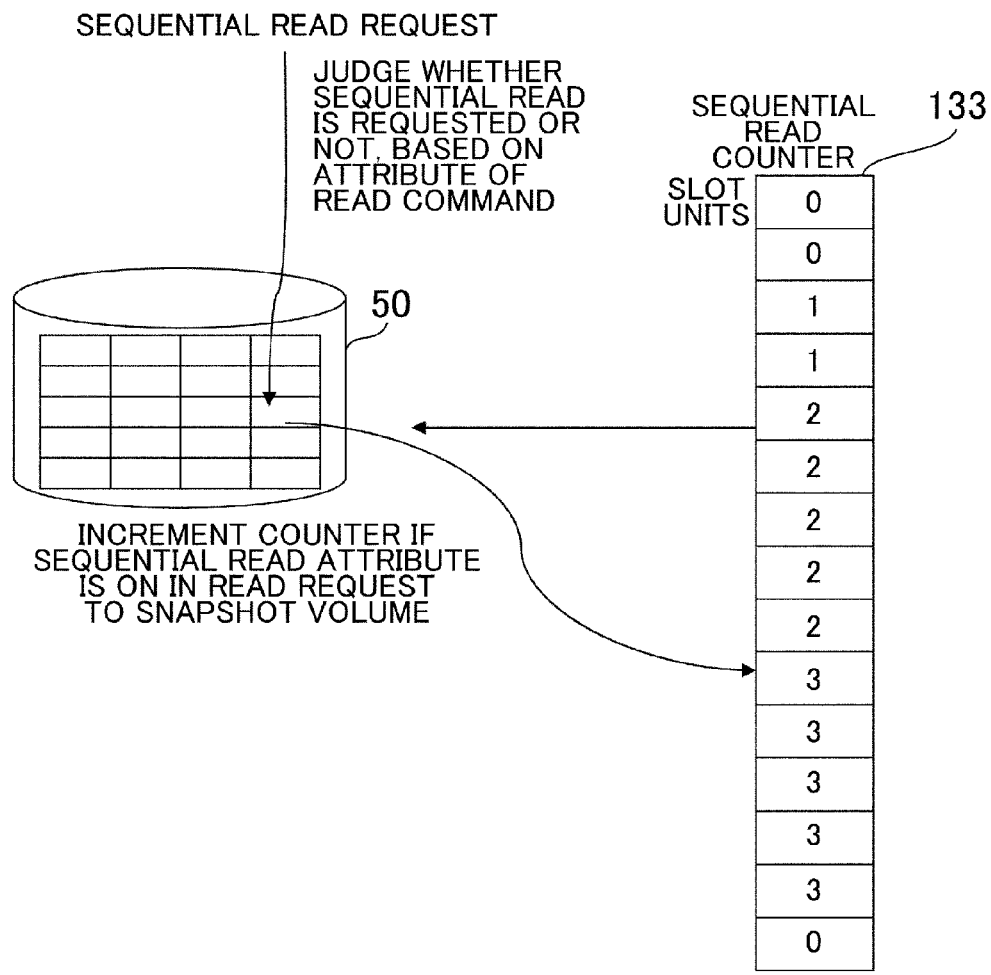
FIG. 10 is a conceptual diagram showing page allocation processing at the time of sequential data reading.

FIG. 10 shows the overview of the setting for a sequential read counter 133 when sequential data reading is performed for the snapshot volume 50. It should be noted that a read request from the host system 2 includes a sequential read attribute indicating whether the request is for sequential data reading or not; and the controller 10 can judge whether the request is for sequential data reading or not based on the presence/absence of this sequential read attribute included in the read request from the host system 2.

The sequential read counter 133 is used to determine in what range of slots data copying from the operation volume 30 to the duplicated volume 40 should be performed. Specifically speaking, the sequential read counter 133 is used to determine in what range of slots the flags of the above-mentioned copy bitmap 132 should be set to "1."

Furthermore, the sequential read counter 133 is constituted from a read counter field in slot units, and the number of times of sequential data reading performed until now is stored in this read counter field.

Therefore, as "0," "0," "1," "1" and so on are set to the read counter field in the case of FIG. 10, it shows that no sequential read request has been made for the first two slots in the snapshot volume 50 until now and only one sequential read request has been made for the following two slots.

Figure 11:
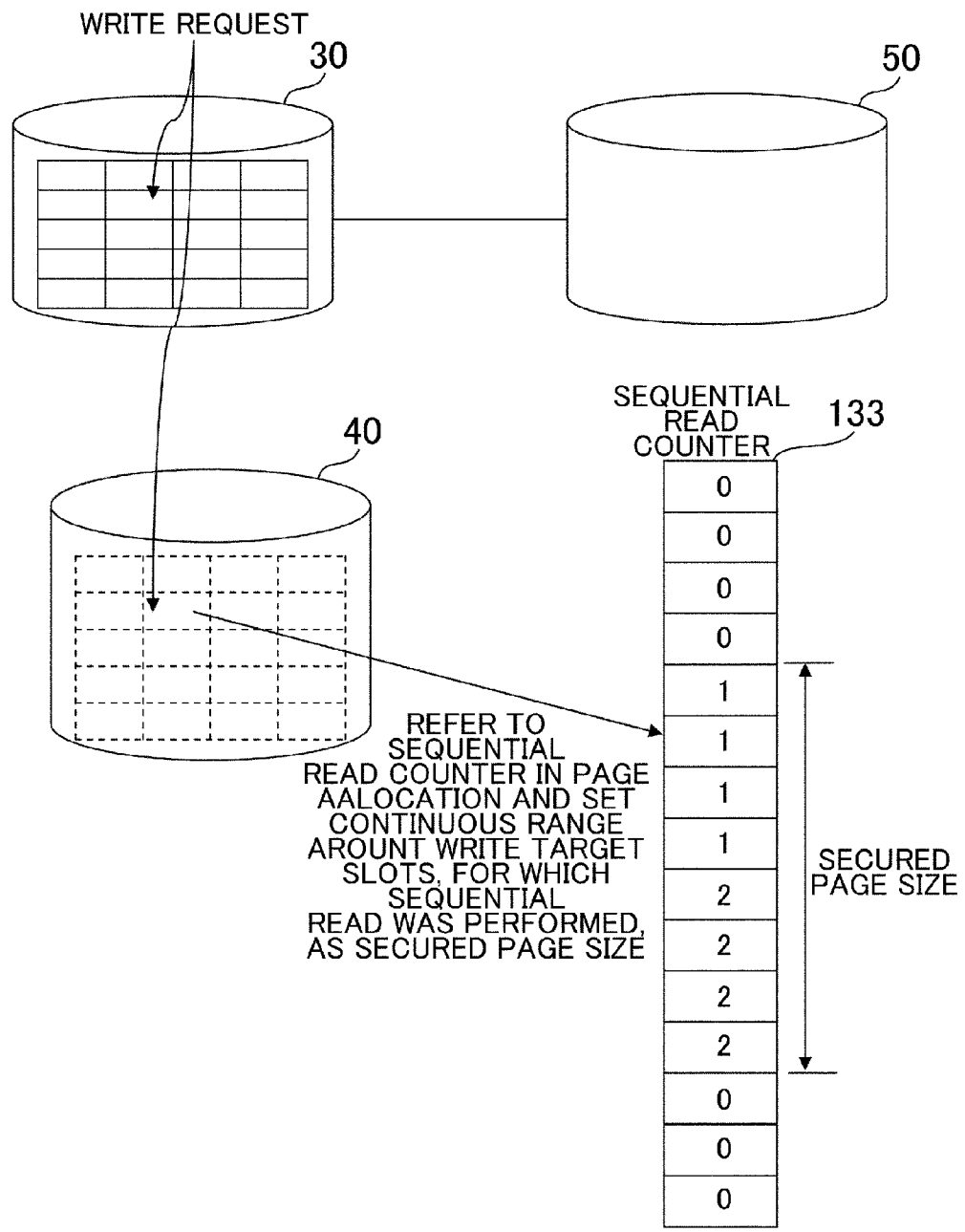
FIG. 11 is a conceptual diagram showing page allocation processing at the time of sequential data reading.

FIG. 11 shows the overview of data copying to the duplicated volume 40 when a write request is made to the operation volume 30. It should be noted that the overview of data copying shown in this example is different from the overview of data copying shown in FIG. 9 because the data copying in this example is based on the frequency of sequential data reading.

It should be noted that the overview of data copy shown in this example is the same as the overview of data copy explained with reference to FIG. 9 in that the copy monitor job regularly monitors the copy bitmap 132 and starts the copy job if the flag "1" is set to the first copy necessity flag field 132A and that the started copy job refers to the copy bitmap 132, judges the necessity of copying in slot units, and copies data corresponding to the slots, to which the copy necessity flag "1" is set, from the operation volume 30 to the duplicated volume 40.

The copy job in this example further refers to the corresponding slots in the sequential read counter 133 and also copies data in a sequential slot range, for which sequential data reading was performed around the slots to which the copy necessity flag "1" is set, from the operation volume 30 to the duplicated volume 40. Specifically speaking, in this example, as reference is made to the sequential read counter 133, the page range to be allocated to the duplicated volume 40 is automatically determined and the data in the determined page range is stored in the duplicated volume 40.

Figure 12:
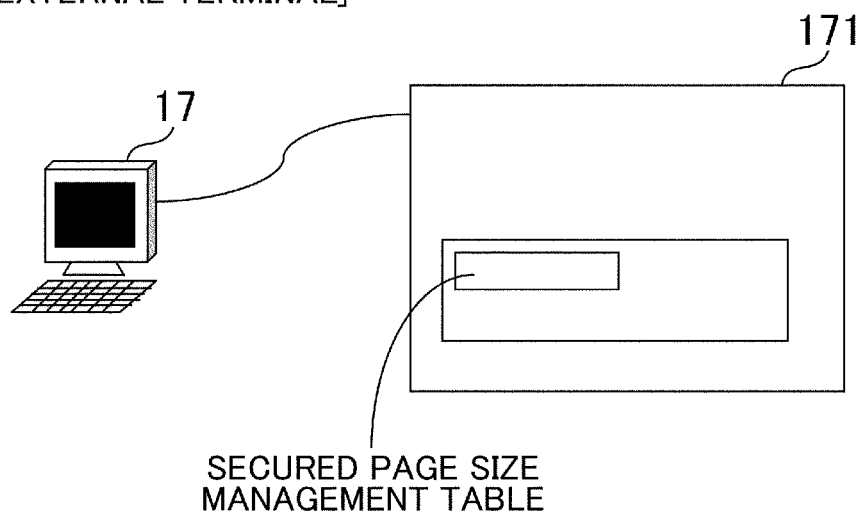
FIG. 12 is a configuration diagram showing a page size specification screen.

FIG. 12 shows a setting screen 171 of the external terminal 17 and an allocated page range which is set on this setting screen 171.

The setting screen 171 of the external terminal 17 displays the setting screen for setting which range of pages should be allocated to the duplicated volume 40 in data copying to the duplicated volume 40 when a write request is made to the operation volume 30. The user can set the page range to be allocated to the duplicated volume 40 in advance by operating the external terminal 17. It should be noted that the page range which is set by the user on this screen may be prioritized and applied over the automatically determined page range which was explained with reference to FIG. 11.

(8) Page Release Operation Based on Access Frequency

Figure 13:
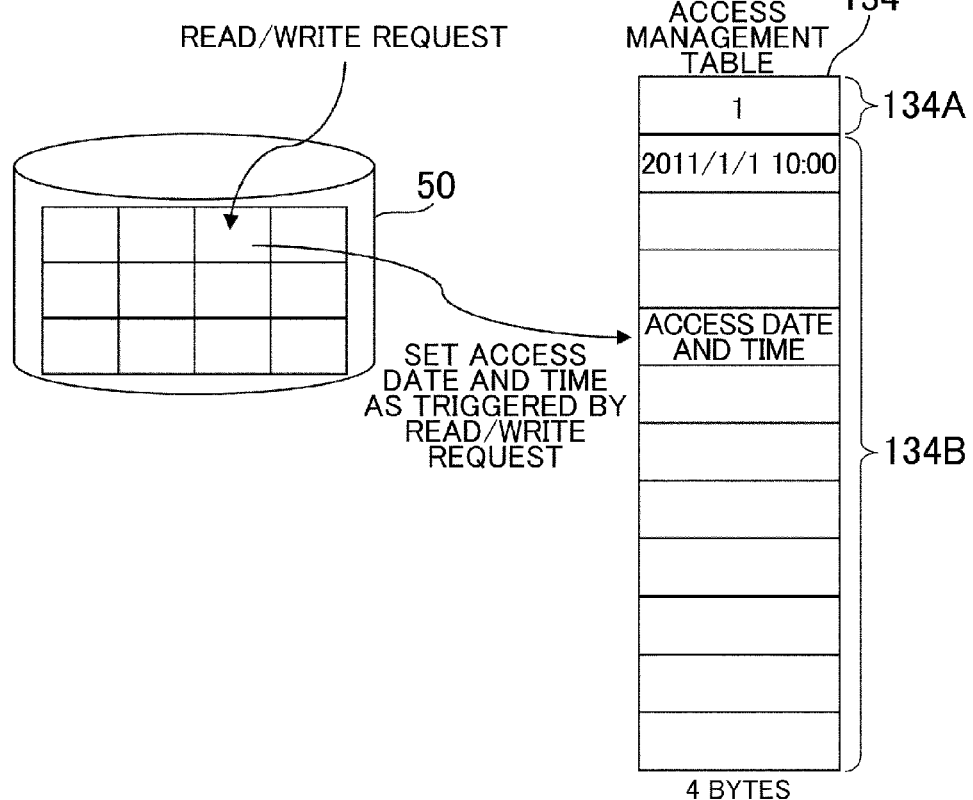
FIG. 13 is a conceptual diagram showing an access management table.

FIG. 13 shows the overview of the setting of the access management table 134 when a read request or a write request is made to the snapshot volume 50.

The access management table 134 is used to determine whether or not to release the pages allocated to the duplicated volume 40.

Furthermore, the access management table 134 is constituted from a check necessity flag field 134A and an access management filed 134B.

The check necessity flag field 134A stores a check necessity flag indicating whether an access check for the snapshot volume 50 is necessary or not. If the access check is necessary, a check necessity flag "1" is set (ON); and if the access check is not necessary, a check necessity flag "0" is set (OFF). Furthermore, the check necessity flag "1" is set as triggered by the read request or the write request made to the snapshot volume 50.

Furthermore, the access management filed 134B stores an access date and time of the latest access in slot units in the snapshot volume 50.

Therefore, as "1" is set to the check necessity flag field 134A in the case of FIG. 13, it is shows that the access check by using the access management table 134 is necessary. Furthermore, as "2011/1/1 10:00" is set to a first slot of the access management filed 134B, it shows that the access request, either a read request or a write request, for the first slot in the snapshot volume 50 was made at 10:00 on Jan. 1, 2011.

FIG. 14 shows the setting screen 171 of the external terminal 17 and page release target time which is set on this setting screen 171.

The setting screen 171 of the external terminal 17 displays the setting screen for setting at which timing the pages allocated to the duplicated volume 40 should be released. The user can set a release period of the pages allocated to the duplicated volume 40 by operating the external terminal 17.

Figure 15:
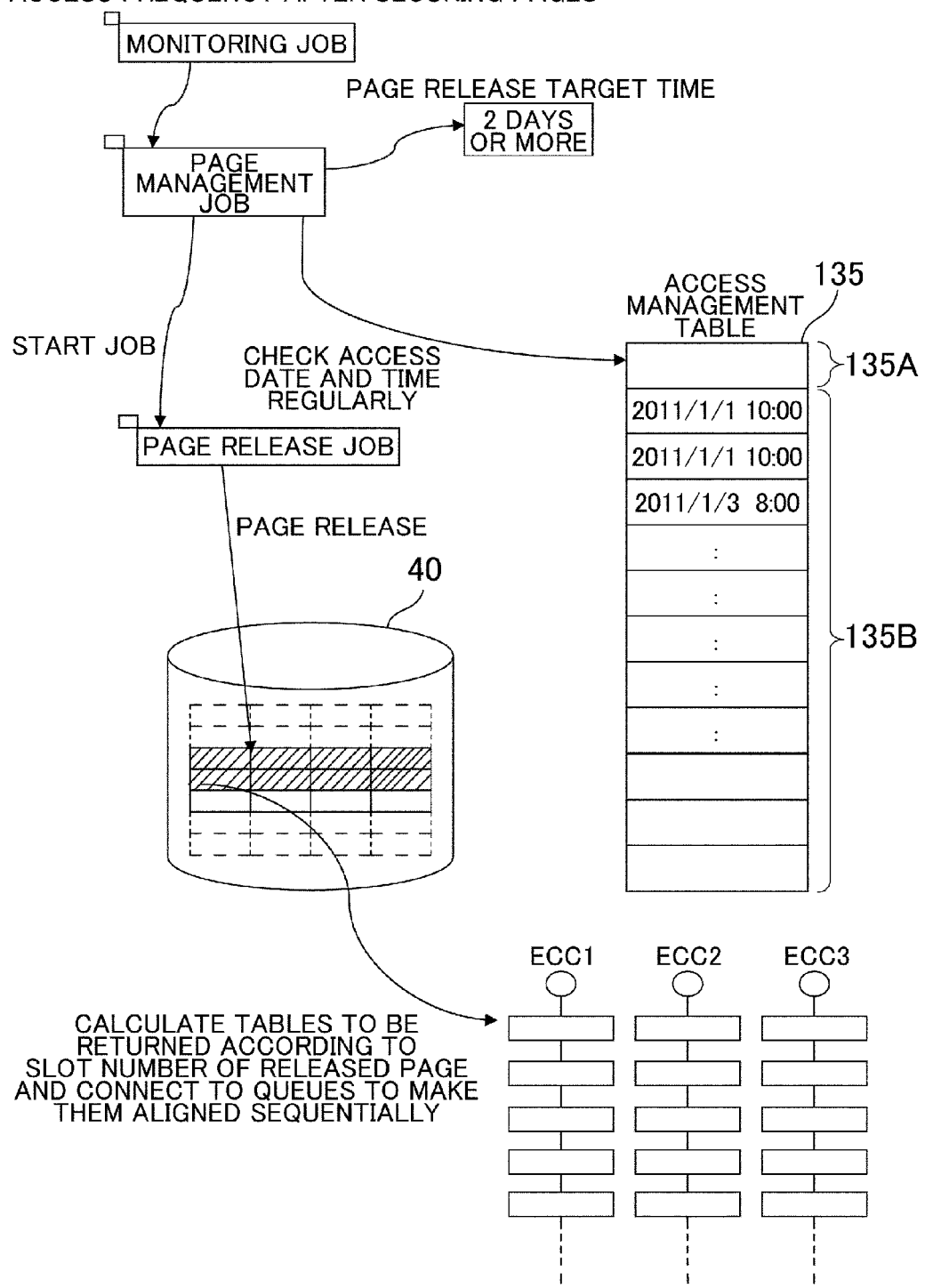
FIG. 15 is a conceptual diagram for explaining page release processing.

FIG. 15 shows the overview of the operation to release the pages allocated to the duplicated volume 40 based on the access frequency.

The monitor job starts the page management job. The started page management job regularly checks the access date and time and the page release target time stored in the access management table 135 and checks whether any slot which has not been accessed for a period of time beyond the page release target time exists or not from among the slots in the duplicated volume 40.

If it is determined as a result of the check that a slot which has not been accessed for a period of time beyond the page release target time exists from among the slots in the duplicated volume 40, the page management job starts a page release job. The started page release job will release the pages in a page unit (=in one-stripe unit or two-slot unit). It should be noted that if either one of the slots has been accessed before the expiration of the page release target time, the page including that slot will not be released.

FIG. 16 shows a free queue management table 136 and an allocated free queue management table 137.

The free queue management table 136 is used to manage free queue addresses for each of a plurality of unused pool areas (free queues) provided by the disk devices 21.

Furthermore, the free queue management table 136 is constituted from a free queue address management field 136A, and free queue addresses are stored in the free queue address management field 136A.

Furthermore, the allocated free queue management table 137 is used to manage which free queue is currently being used among a plurality of free queues provided by the disk devices 21.

Furthermore, the allocated free queue management table 137 is constituted from an allocated free queue field 137A, and the number of a free queue in use (e.g. an identifier of the pool area ECC1) is stored in the allocated free queue field 137A.

Figure 17:
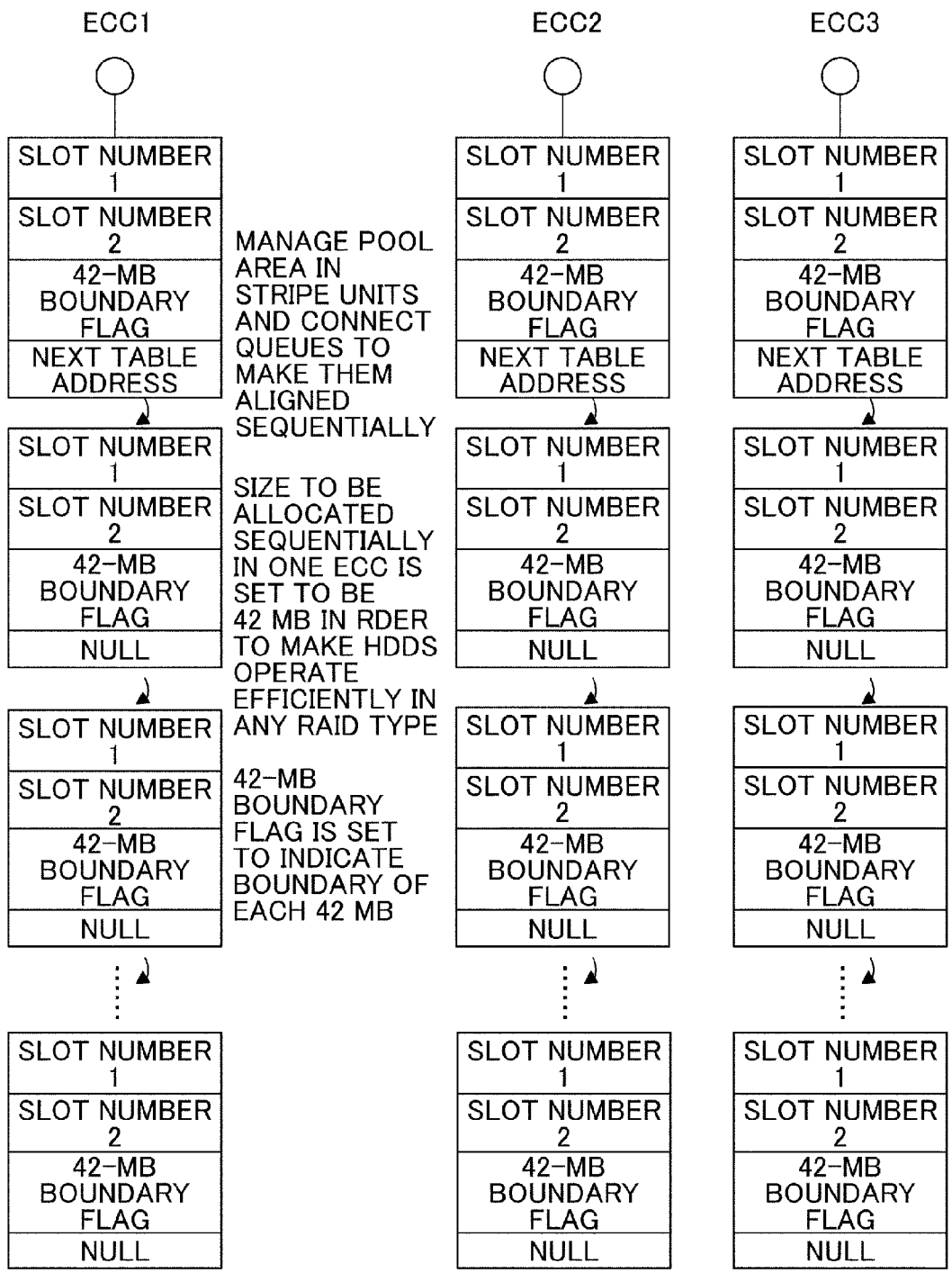
FIG. 17 is a conceptual diagram showing a data area vacancy management table.

FIG. 17 shows a data area vacancy management table 138.

The data area vacancy management table 138 is used to manage the positions of storage areas in the disk devices 21 in stripe units for each pool area so that if data is stored in the storage areas of the disk devices 21, the data may be sequentially stored. Specifically speaking, a plurality of data area management tables 131C are connected and managed in the data area vacancy management table 138. Therefore, information of a data space for two slots which are the stripe unit, a 42-MB boundary flag, and a next table address are stored in the data area vacancy management table 138. It should be noted that the size to be allocated sequentially in one pool area is set to be 42 MB in order to make the disk devices 21 operate efficiently in any RAID type.

(9) Processing Procedure of Various Types of Processing

The processing procedures of various types of processing executed by the storage apparatus 4 will be explained below. It should be noted that the various types of processing are executed on the channel adapter 11 or the storage device 20, which accepts a read request or a write request from the host system 2, by a disk adapter which actually executes the read processing or the write processing; however, the following explanation will be given by recognizing the controller 10 as the subject of the various types of processing.

Figure 18:
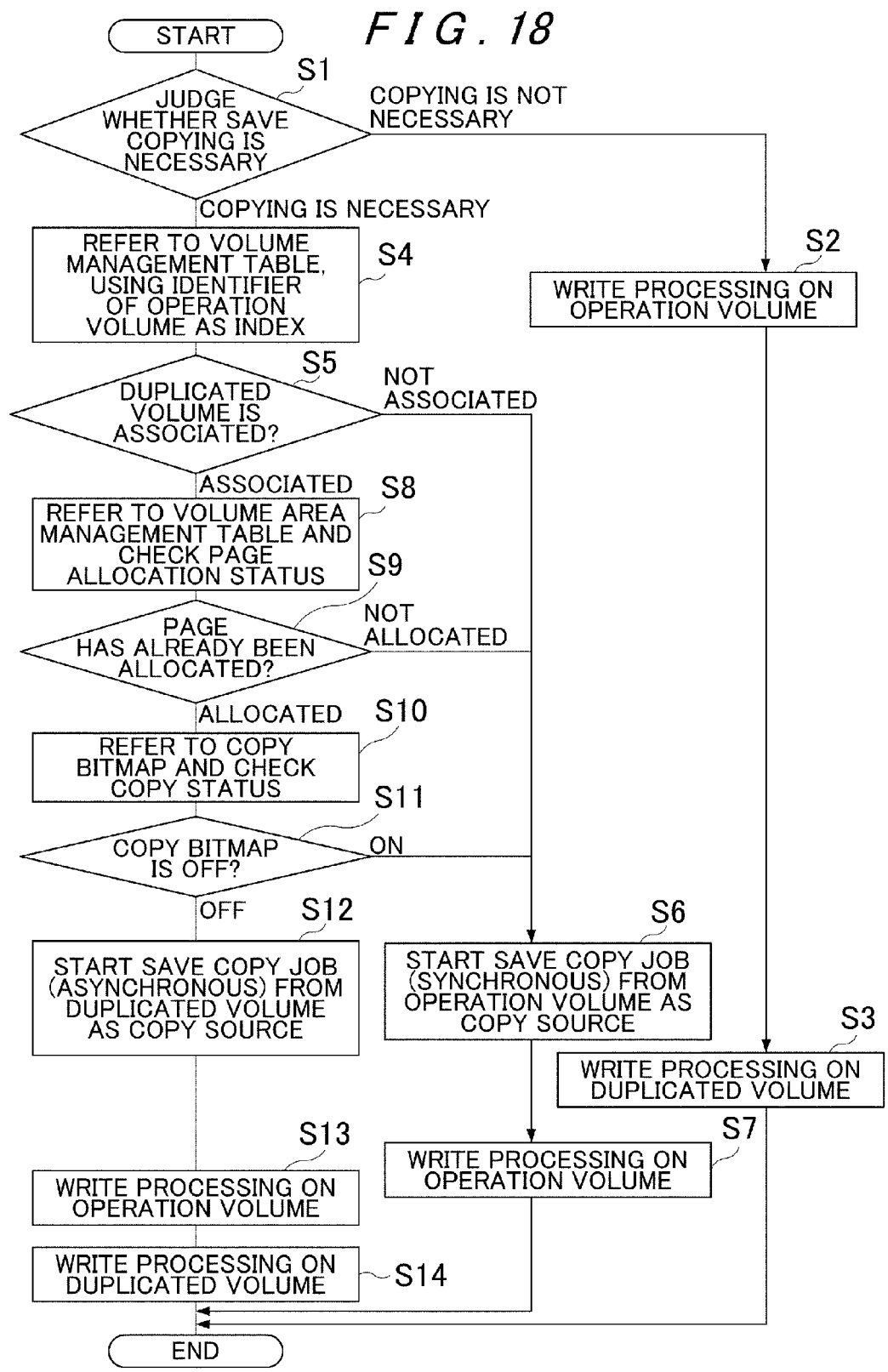
FIG. 18 is a flowchart showing write processing on the operation volume.

FIG. 18 shows a processing procedure of write processing on the operation volume 30 as executed by the controller 10 for the storage apparatus 4. After receiving a write request for the operation volume 30 from the host system 2, the controller 10 starts the write processing on the operation volume 30 as shown in this FIG. 18.

After receiving a write request for the operation volume 30 from the host system 2, before executing the write processing on the operation volume 30, the controller 10 performs save copy necessity judgment to judge whether data which should be saved to the duplicated volume 40 exists or not (S1).

If it is determined as a result of this judgment that copying is not necessary, the controller 10 determines that no data that should be saved exists for some reason, for example, that the data has already been saved; and then executes the write processing on the operation volume 30 (S2).

After executing the write processing on the operation volume 30, the controller 10 also executes the write processing on the duplicated volume 40 in the same manner (S3) and then terminates this processing.

On the other hand, if it is determined as a result of the judgment in step S1 that copying is necessary, the controller 10 refers to the volume management table 131A and searches for the identifier (LUN) of the operation volume 30 included in the write request (S4).

Subsequently, the controller 10 judges whether or not the duplicated volume 40 is associated with the operation volume 30 of the found identifier (S5).

Specifically speaking, the controller 10 refers to the volume management table 131A to check whether the "LUN of Duplicated Volume" is stored or not in the area where the operation volume 30 is managed in the volume management table 131A. If the "LUN of Duplicated Volume" is stored, the controller 10 determines that the duplicated volume is associated; and if the "LUN of Duplicated Volume" is not stored, the controller 10 determines that the duplicated volume is not associated.

If a judgment result is obtained that the duplicated volume is not associated, the controller 10 starts the copy job to save data from the operation volume 30 to the snapshot volume 50 as conventionally performed, and then saves the data from the operation volume 30 to the snapshot volume 50 (S6).

After saving the data to the snapshot volume 50, the controller 10 executes the write processing on the operation volume 30 (S7) and then terminates this processing.

On the other hand, if it is determined as a result of the judgment in step S5 that the duplicated volume is associated, the controller 10 refers to the volume area management table 131B and checks the page allocation status of the duplicated volume 40 (S8).

Subsequently, the controller 10 judges whether the page has already been allocated to the duplicated volume 40 or not (S9).

If a judgment result is obtained that no page has been allocated, the controller 10 proceeds to step S6 and saves the data from the operation volume 30 to the snapshot volume 50 as explained above (S6).

On the other hand, if it is determined as a result of the judgment in step S9 that a page has been allocated, the controller 10 refers to the copy bitmap 132 and checks the copy status of the duplicated volume 40 (S10).

Subsequently, the controller 10 refers to the copy bitmap 132 and judges whether the copy necessity flag of the first copy necessity flag field 132A is set to "0" or not (S11).

If it is determined as a result of the judgment that the copy necessity flag is "1," the controller 10 starts the copy job and saves the data from the operation volume 30 to the snapshot volume 50 (S6). After saving the data to the snapshot volume 50, the controller 10 executes the write processing on the operation volume 30 (S7) and then terminates this processing.

Meanwhile, if it is determined as a result of the judgment in step S11 that the copy necessity flag is "0," the controller 10 starts the copy job and saves the data from the duplicated volume 40 to the snapshot volume 50 (S12).

After executing the write processing on the operation volume 30 (S13) and then executing the write processing on the duplicated volume 40 (S14), the controller 10 terminates this processing.

Figure 19:
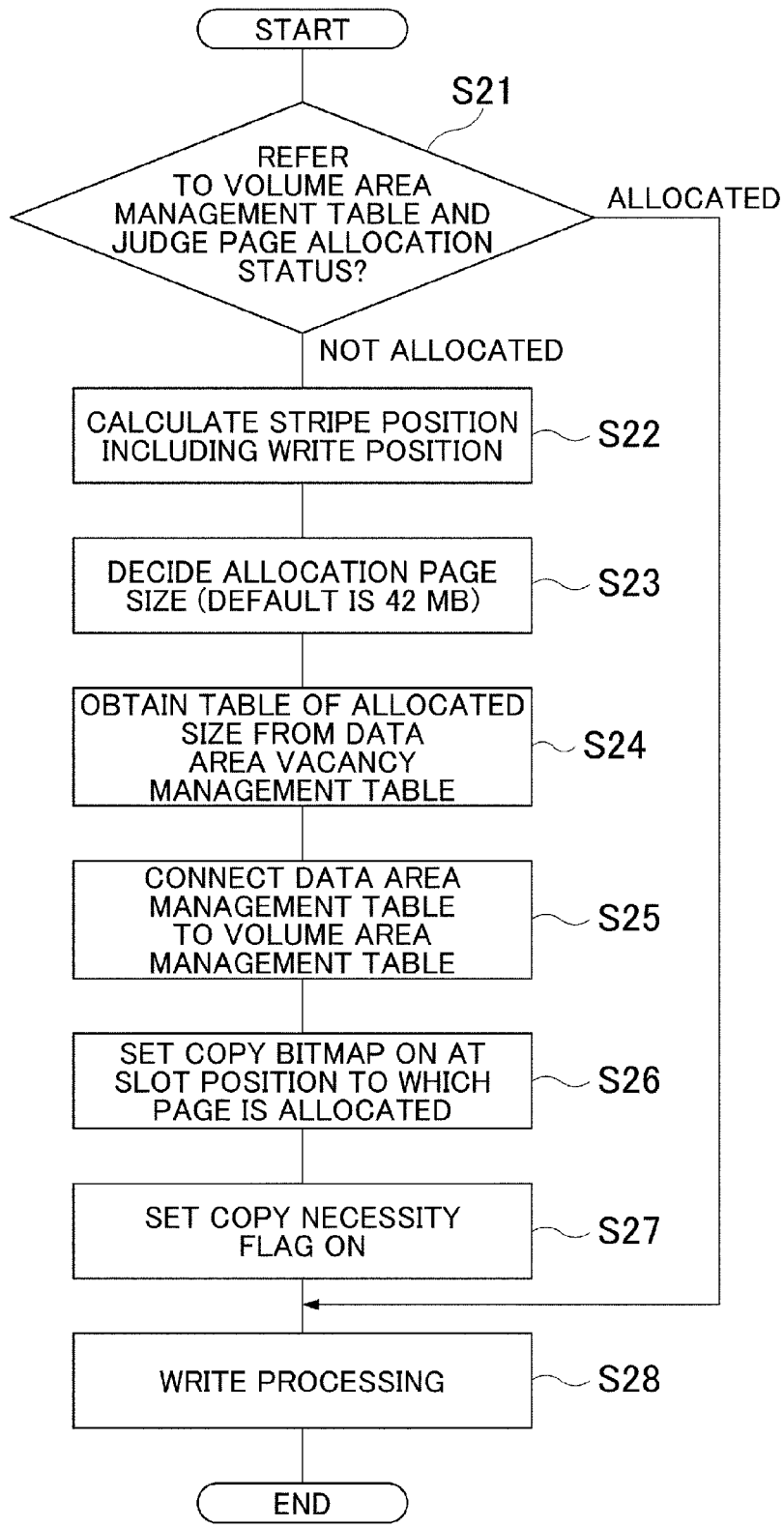
FIG. 19 is a flowchart showing write processing on the duplicated volume.

FIG. 19 shows a processing procedure of write processing on the duplicated volume 40 as executed by the controller 10 for the storage apparatus 4. After receiving a write request for the operation volume 30 from the host system 2, the controller 10 executes the write processing on the operation volume 30 as shown in FIG. 18 and, at the same time as this write processing, also starts the write processing on the duplicated volume 40 as shown in this FIG. 19.

The controller 10 refers to the volume area management table 131B and judges the page allocation status of the duplicated volume 40 (S21).

If it is determined as a result of the judgment that no page has been allocated, the controller 10 determines that it is necessary to allocate a page to the duplicated volume 40; refers to the volume area management table 131B; and determines a stripe position including a write position (S22).

Subsequently, the controller 10 determines a page size of the page to be allocated (S23). It should be noted that a default page size is set as 42 MB.

Then, the controller 10 refers to the data area vacancy management table 138 and obtains as many tables as the page size of the allocated page (S24).

Next, the controller 10 connects the data area management tables 131C to the volume area management table 131B and executes the write processing on the duplicated volume 40 (S25).

Then, the controller 10 sets the flag of the slot position, to which a page is allocated, to "1" in the second copy necessity flag field 132B of the copy bitmap 132 (S26).

Subsequently, the controller 10 sets the flag of the first copy necessity flag field 132A of the copy bitmap 132 to "1" (S27), executes the write processing (S28), and terminates this processing.

On the other hand, if it is determined as a result of the judgment in step S21 that a page has already been allocated, the controller 10 determines that a page has already been allocated to the duplicated volume 40. Then, the controller 10 executes the write processing on the already allocated page (S28) and terminates this processing.

Figure 20:
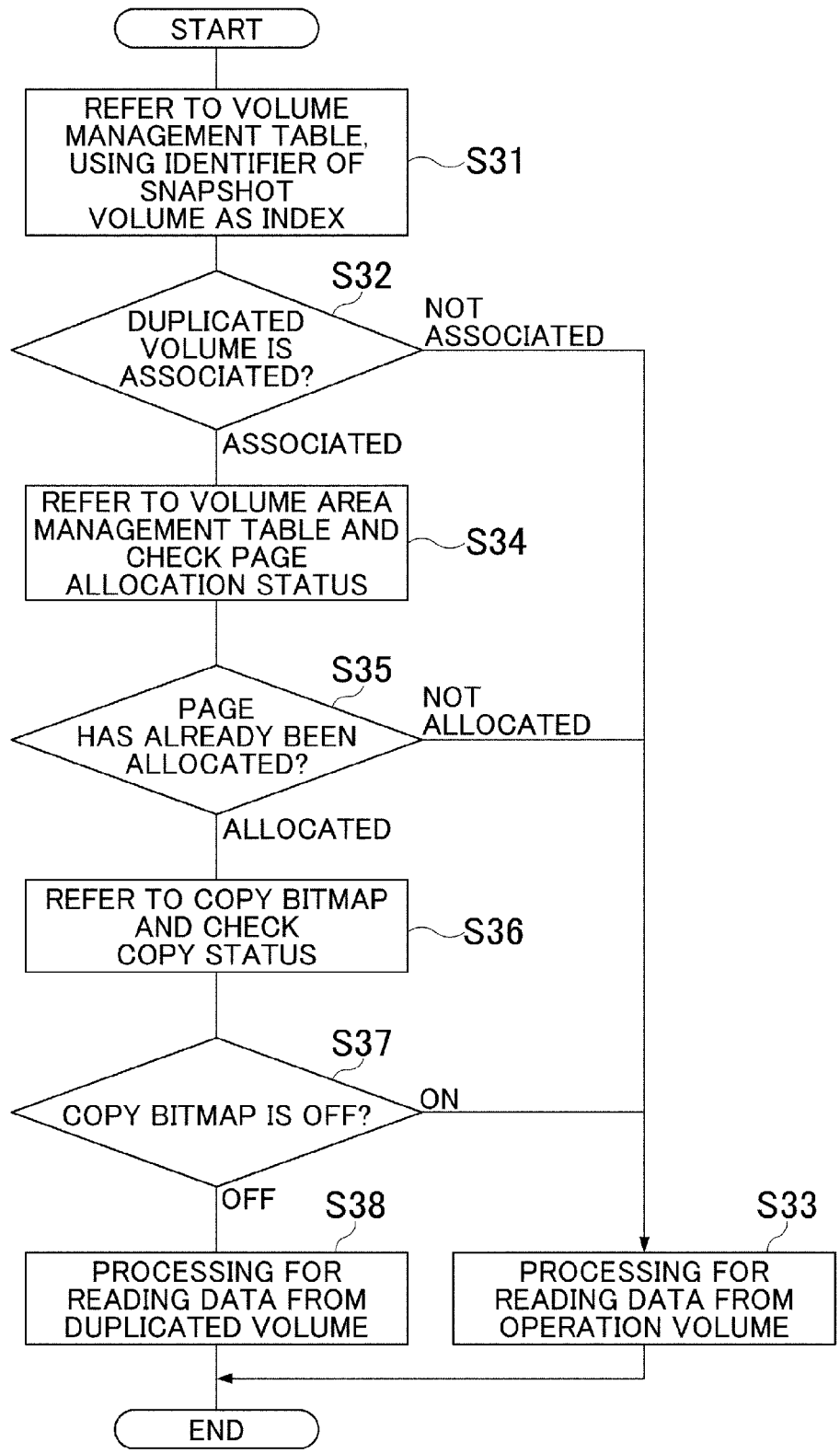
FIG. 20 is a flowchart showing read processing on a snapshot.

FIG. 20 shows a processing procedure of processing for reading data from the snapshot volume 50 as executed by the controller 10 for the storage apparatus 4. The controller 10 starts the read processing as shown in this FIG. 20 after receiving a read request for the snapshot volume 50 from the host system 2.

The controller 10 refers to the volume management table 131A and searches for the identifier (LUN) of the snapshot volume 50 included in the read request (S31).

Subsequently, the controller 10 judges whether or not the duplicated volume 40 is associated with the snapshot volume 50 of the found identifier (S32).

Specifically speaking, the controller 10 refers to the volume management table 131A to check whether the "LUN of Duplicated Volume" is stored or not in the area where the snapshot volume 50 is managed in the volume management table 131A. If the "LUN of Duplicated Volume" is stored, it is determined that the duplicated volume is associated; and if the "LUN of Duplicated Volume" is not stored, it is determined that the duplicated volume is not associated.

If it is determined as a result of the judgment that the duplicated volume is not associated, the controller 10 executes the read processing for reading the data from the operation volume 30 to the snapshot volume 50 (S33) as conventionally performed, and then terminates this processing.

On the other hand, if it is determined as a result of the judgment in step S32 that the duplicated volume is associated, the controller 10 refers to the volume area management table 131B and checks the page allocation status of the duplicated volume 40 (S34).

Then, the controller 10 judges whether a page has already been allocated to the duplicated volume 40 or not (S35).

If it is determined as a result of the judgment that no page has been allocated, the controller 10 proceeds to step S33, executes the read processing for reading the data from the operation volume 30 to the snapshot volume 50 as explained above (S33), and terminates this processing.

On the other hand, if it is determined as a result of the judgment in step S35 that a page has been allocated, the controller 10 refers to the copy bitmap 132 and checks the copy status of the duplicated volume 40 (S36).

Furthermore, the controller 10 refers to the copy bitmap 132 and judges whether the copy necessity flag of the first copy necessity flag field 132A is set to "0" or not (S37).

If it is determined as a result of the judgment that the copy necessity flag is "1," the controller 10 executes the read processing for reading the data from the operation volume 30 to the snapshot volume 50 as explained above (S33) and then terminates this processing.

On the other hand, if it is determined as a result of the judgment in step S37 that the copy necessity flag is "0," the controller 10 executes the read processing for reading the data from the duplicated volume 40 to the snapshot volume 50 (S38) and then terminates this processing.

FIG. 21 shows a processing procedure of write processing on the snapshot volume 50 as executed by the controller 10 for the storage apparatus 4. After receiving a write request for the snapshot volume 50 from the host system 2, the controller 10 starts the write processing on the snapshot volume 50 as shown in FIG. 21.

The controller 10 refers to the volume management table 131A and searches for the identifier (LUN) of the snapshot volume 50 included in the write request (S41).

Then, the controller 10 judges whether or not the duplicated volume 40 is associated with the snapshot volume 50 of the found identifier (S42).

Specifically speaking, the controller 10 refers to the volume management table 131A to check whether the "LUN of Duplicated Volume" is stored or not in the area where the snapshot volume 50 is managed in the volume management table 131A. If the "LUN of Duplicated Volume" is stored, it is determined that the duplicated volume is associated; and if the "LUN of Duplicated Volume" is not stored, it is determined that the duplicated volume is not associated. If it is determined as a result of the judgment that the duplicated volume is not associated, the controller 10 saves the data from the operation volume 30 to the snapshot pool 60 as conventionally performed (S43), then executes the write processing on the snapshot volume 50 (S44), and terminates this processing.

On the other hand, if it is determined as a result of the judgment in step S42 that the duplicated volume is associated, the controller 10 refers to the volume area management table 131B and checks the page allocation status of the duplicated volume 40 (S45).

Then, the controller 10 judges whether a page has already been allocated to the duplicated volume 40 or not (S46).

If it is determined as a result of the judgment that no page has been allocated, the controller 10 proceeds to step S43 and saves the data from the operation volume 30 to the snapshot volume 50 as explained above (S43), then executes the write processing on the snapshot volume 50 (S44), and terminates this processing.

On the other hand, if it is determined as a result of the judgment in step S46 that a page has been allocated, the controller 10 refers to the copy bitmap 132 and checks the copy status of the duplicated volume 40 (S47).

Subsequently, the controller 10 refers to the copy bitmap 132 and judges whether the copy necessity flag of the first copy necessity flag field 132A is set to "0" or not (S48).

If it is determined as a result of the judgment that the copy necessity flag is "1," the controller 10 saves the data from the operation volume 30 to the snapshot volume 50 as explained above (S43), then executes the write processing on the snapshot volume 50 (S44), and terminates this processing.

On the other hand, if it is determined as a result of the judgment in step S48 that the copy necessity flag is "0," the controller 10 saves the data from the duplicated volume 40 to the snapshot volume 50 (S49), then executes the write processing on the snapshot volume 50 (S44), and terminates this processing.

FIG. 22 shows a processing procedure of association processing on the duplicated volume 40 as executed by the controller 10 for the storage apparatus 4. It should be noted that, as a premise, the controller 10 accepts the identifier of the duplicated volume 40 to be associated and the identifier of the operation volume 30 specified as a target to be associated with the duplicated volume 40 as input values from the external terminal 17.

The controller 10 refers to the identifier of the operation volume 30 among the accepted input values and judges whether the operation volume 30 is set to constitute a pair with the snapshot volume 50 or not (S51).

Next, if a negative judgment result is obtained, the controller 10 determines that the pair setting is not set to the operation volume 30 specified as the target of association and the snapshot volume 50; reports an error response to the external terminal 17 (S52), and terminates this processing.

On the other hand, if an affirmative judgment result is obtained in step S51, the controller 10 judges whether the duplicated volume 40 has already been associated with the operation volume 30 specified as the target of association or not (S53).

If an affirmative judgment result is obtained in this step, the controller 10 determines that the duplicated volume 40 has already been associated with the operation volume 30 specified as the target of association, reports an error response to the external terminal 17 as explained above (S52), and terminates this processing.

On the other hand, if a negative judgment result is obtained in step S53, the controller 10 judges whether the duplicated volume specified as the target of association is currently in a usable state or not (S54). Incidentally, if the specified duplicated volume 40 is not associated with, for example, a real volume and a page cannot be allocated, the duplicated volume cannot be recognized as being in the usable state.

If a negative judgment result is obtained in this step, the controller 10 determines that the specified duplicated volume 40 is currently not in the usable state, reports an error response to the external terminal 17 as explained above (S52), and terminates this processing.

On the other hand, if an affirmative judgment result is obtained in step S54, the controller 10 determines that the specified duplicated volume 40 is currently in the usable state, and sets the identifier of the specified duplicated volume to the "LUN of Duplicated Volume" of the area for managing the operation volume 30 in the volume management table 131A (S55).

Then, the controller 10 sets the identifier of the specified duplicated volume to the "LUN of Duplicated Volume" of the area for managing the snapshot volume 50 in the volume management table 131A (S56).

Subsequently, the controller 10 secures the volume area management table 131B, the copy bitmap 132, the sequential read counter 133, and the access management table 134, which are used to manage the duplicated volume 40, in the shared memory 13 (S57).

Then, the controller 10 sets the "Address of Volume Area Management Table," "Address of Copy Bitmap," "Address of Sequential Read Counter," and "Address of Access Management Table" of the area for managing the duplicated volume 40 in the volume management table 131A (S58).

Subsequently, the controller 10 notifies the external terminal 17 of the termination of the association processing (S59) and then terminates this processing.

Figure 23A:
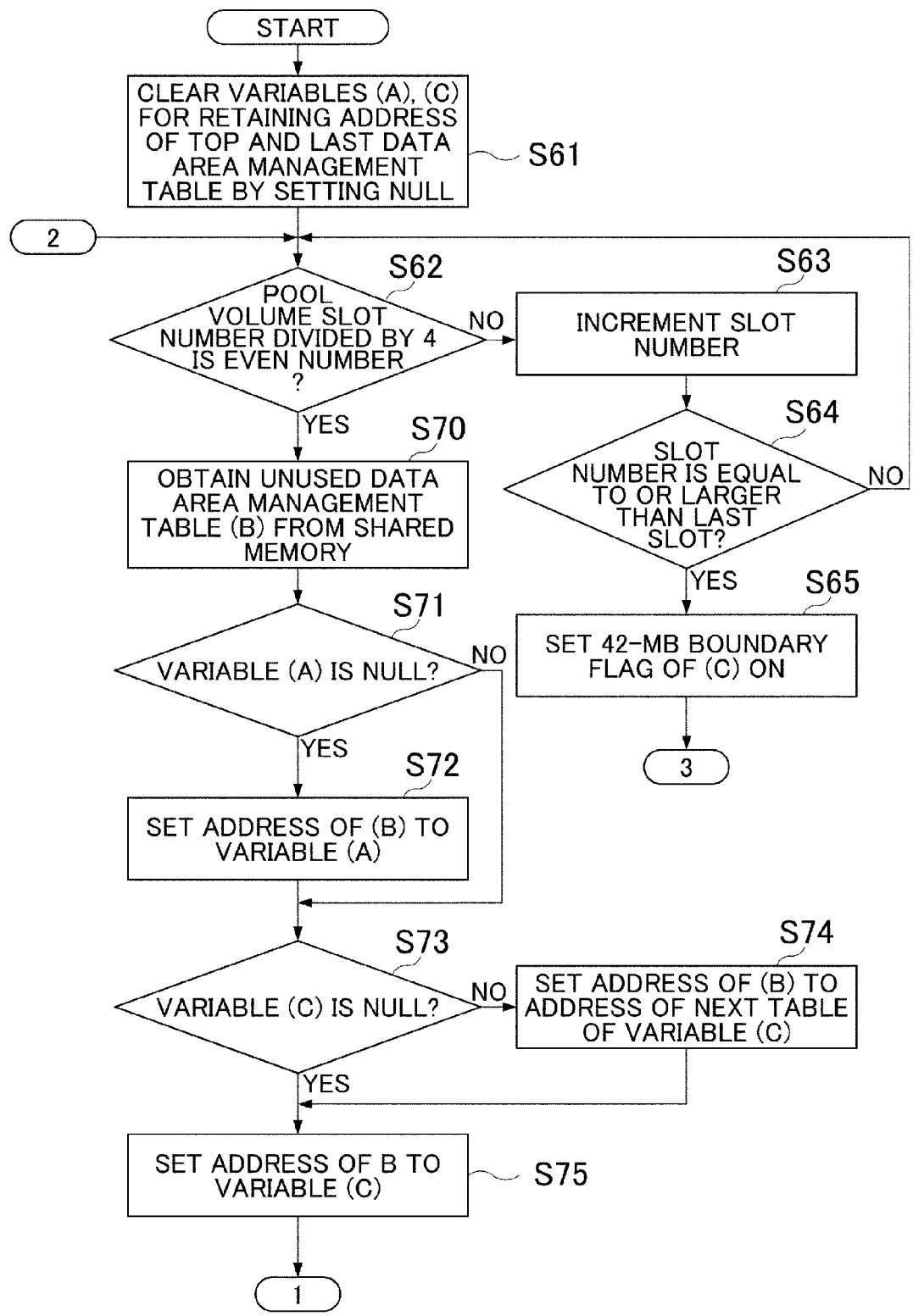
FIG. 23A is a flowchart showing pool volume addition processing.
Figure 23B:
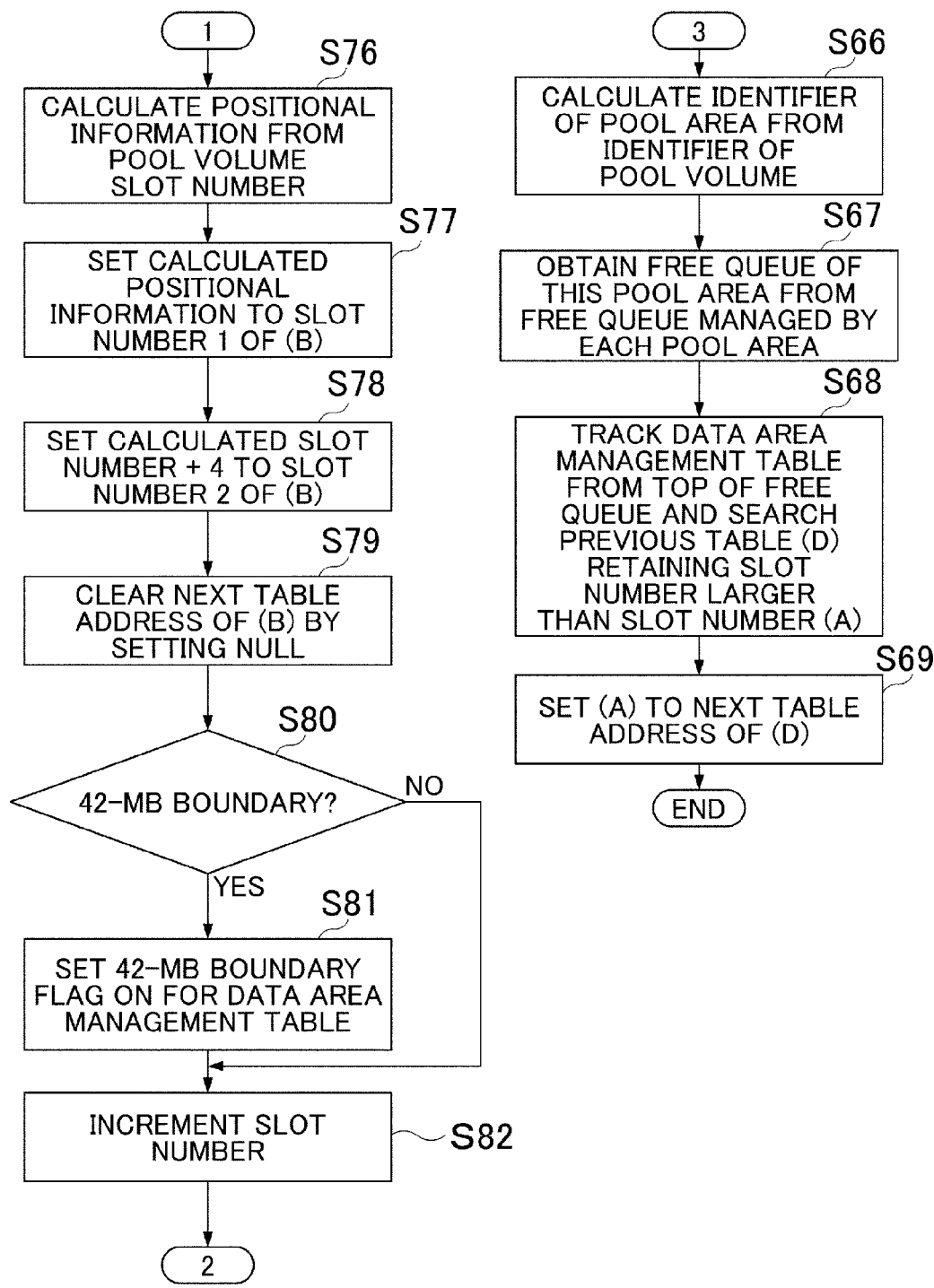
FIG. 23B is a flowchart showing the pool volume addition processing.

FIG. 23A and FIG. 23B show a processing procedure of addition processing executed by the controller 10 for the storage apparatus 4 when adding a pool volume to be associated with the duplicated volume 40. This processing manages the positions of the storage areas of pool volumes by free queues (see FIG. 17) and sets how to connect those free queues.

Among the plurality of data area management tables 131C (free queues) managed by the data area vacancy management table 138, the controller 10 clears variable A for retaining the address of the data area management table 131C at the top of the relevant queue and variable C for retaining the address of the data area management table 131C at the end of the queue by setting a NULL character (S61).

It should be noted that "clearing by setting the NULL character" means to achieve the state where no address of the data area management table 131C is retained. Therefore, as a result of the processing in this example, the state where the variable A and the variable C do not indicate any of the free queues is achieved.

Next, the controller 10 judges whether a value obtained by dividing the slot number of the target slot, from among the plurality of slots in the four pool volumes to be associated with the duplicated volume 40, by four is an even number or not (S62).

In this embodiment, pages are allocated in two-slot units, each of which is one stripe unit. So, if the value obtained by dividing the slot number of the target slot by four is an even number, a page will be allocated from the next slot; and the value obtained by dividing the slot number of the target slot by four is an odd number, the same page as allocated to the target slot will be also allocated to the next slot.

If a negative judgment result is obtained in this step, the controller 10 determines that the value obtained by dividing the slot number of the target slot by four is an odd number and increments the slot number of the target slot by one (S63).

Furthermore, the controller 10 judges whether or not the slot number of the next slot, which is obtained by incrementing the slot number of the target slot by one, is equal to or larger than the last slot number of the free queue (S64).

If a negative judgment result is obtained in this step, the controller 10 determines that the incremented slot number of the next slot is not the last number; and proceeds to step S62.

On the other hand, if an affirmative judgment result is obtained in step S64, the controller 10 determines that the incremented slot number of the next slot is the last number; and sets the "42-MB boundary flag" ON of the data area management table 131C for managing the slot of this slot number (S65).

Next, based on the identifier of a pool volume to be associated with the duplicated volume 40, the controller 10 calculates the identifier of a pool area including that pool volume (S66).

Then, the controller 10 refers to the data area vacancy management table 138 for managing each of the pool areas and obtains a free queue from the pool area calculated at step S66 (S67).

Subsequently, the controller 10 tracks the data area management tables 131C from the top of the free queue obtained in step S67 and searches for variable D indicating the address of a data area management table 131C immediately before a data area management table 131C retaining the slot number 1 larger than the slot number 1 of the variable A (S68).

Then, the controller 10 sets the variable A to the "next table address" of the data area management table 131C indicated by the variable D (S69) and terminates this processing.

On the other hand, if an affirmative judgment result is obtained in step S62, the controller 10 determines that the value obtained by dividing the slot number of the target slot by four is an even number and obtains variable B indicating an unused data area management table 131C from the shared memory 13 (S70).

Then, the controller 10 judges whether the variable A indicating the top data area management table 131C is NULL or not (S71).

If an affirmative judgment result is obtained in this step, the controller 10 sets the address of the variable B to the variable A which is NULL (S71) and proceeds to step S73. On the other hand if a negative judgment result is obtained in this step, the controller 10 proceeds to step S73.

Subsequently, the controller 10 judges whether the variable C is NULL or not (S73).

If a negative judgment result is obtained in this step, the controller 10 sets the address of the variable B to the "next table address" stored in the last data area management table 131C of the queue (S74) and proceeds to step S75. On the other hand, if an affirmative judgment result is obtained in this step, the controller 10 proceeds to step S75.

Then, the controller 10 sets the variable C to the address of the data area management table 131C indicated by the variable B (S75).

Next, the controller 10 calculates positional information of the plurality of slots in the pool volumes to be associated with the duplicated volume 40 based on the slot number of the target slot (S76).

Subsequently, the controller 10 sets the positional information of the calculated slot to the "slot number 1" in the data area management table 131C indicated by the variable B (S77).

Furthermore, the controller 10 sets the positional information obtained by incrementing the positional information of the calculated slot by four, to the "slot number 2" of the data area management table 131C indicated by the variable B (S78).

Then, the controller 10 clears the "next table address" of the data area management table 131C indicated by the variable B by setting the NULL character (S79).

Next, the controller 10 judges whether the "42-MB boundary flag" of the data area management table 131C indicated by the variable B is ON or not (S80).

If an affirmative judgment result is obtained in this step, the controller 10 sets the 42-MB boundary flag ON (S81) and proceeds to step S82. On the other hand, if a negative judgment result is obtained in this step, the controller 10 proceeds to step S82.

The controller 10 increments the slot number by one (S82) and proceeds to step S62. Subsequently, the controller 10 executes the same processing as the processing explained earlier (from S63 to S69 or from S70 to S82) and terminates the processing.

FIG. 24 shows a processing procedure of page allocation processing executed by the controller 10 for the storage apparatus 4 when actually allocating pages to the duplicated volume 40.

The controller 10 refers to the allocated free queue management table 137 and obtains a free queue (an identifier of the pool area) (S91).

Next, the controller 10 calculates the required number of data area management tables 131C based on the page size of pages to be allocated (S92).

Next, the controller 10 refers to the free queue obtained in step S91 and tracks the data area management tables 131C sequentially from the top of the free queue (S93).

Furthermore, the controller 10 judges whether the "42-MB boundary flag" of the data area management table 131C is ON or not (S94).

If an affirmative judgment result is obtained in this step, the controller 10 determines that the "42-MB boundary flag" is ON, refers to the free queue management table 136, and searches for a next free queue (next pool area) (S95).

Then, the controller 10 sets the found free queue to the allocated free queue management table 137 (S96).

On the other hand, if a negative judgment result is obtained in step S94, the controller 10 determines that the "42-MB boundary flag" is not ON; and counts up the number of tables in the same pool area (S97).

Then, the controller 10 judges whether the counted up number of tables has reached the required number or not (S98).

If a negative judgment result is obtained in this step, the controller 10 determines that the counted up number of tables has not reached the required number yet; and proceeds to step S94. On the other hand, if an affirmative judgment result is obtained in this step, the controller 10 determines that the counted up number of tables has reached the required number; and proceeds to step S99.

The controller 10 sets the next data area management table 131C of the fetched data area management tables 131C to the top of the free queue (S99).

Then, the controller 10 returns the starting address of the data area management table 131C and the number of tables (S100) and terminates this processing.

Figure 25:
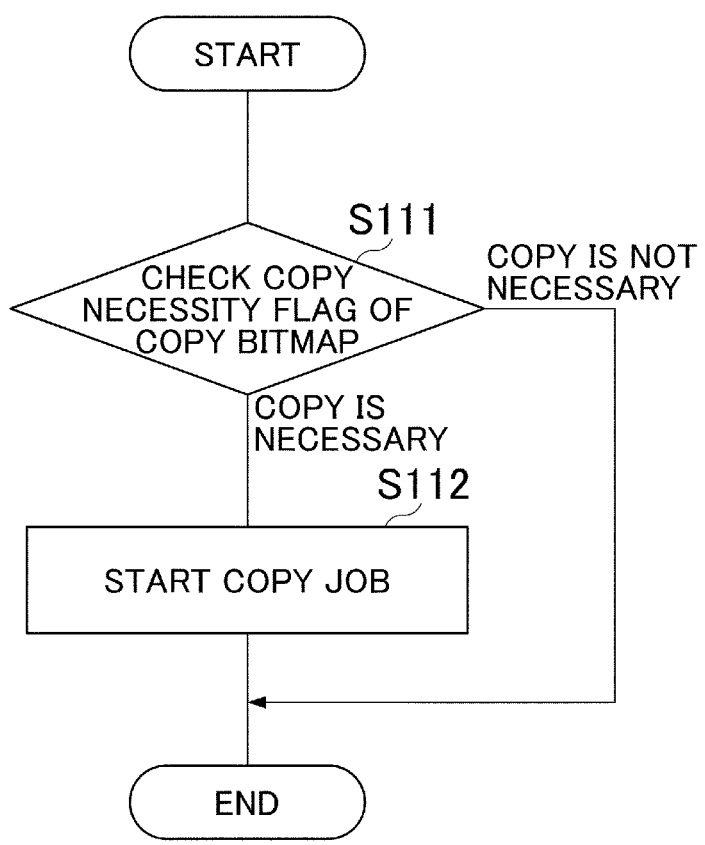
FIG. 25 is a flowchart showing background copy processing.

FIG. 25 shows a processing procedure of copy processing executed by the controller 10 for the storage apparatus 4 by starting a copy monitor job when performing background copying to pages secured as triggered by the write processing on the operation volume 30.

The controller 10 starts the copy monitor job and regularly monitors the first copy necessity flag field 132A of the copy bitmap 132 by the started copy monitor job (S111).

If it is determined as a result of this regular monitoring that copying is necessary, the controller 10 starts the copy job (S112) and terminates the processing by the copy monitor job. On the other hand, if it is determined as a result of the monitoring in step S111 that copying is not necessary, the controller 10 terminates the processing by the copy monitor job.

Figure 26:
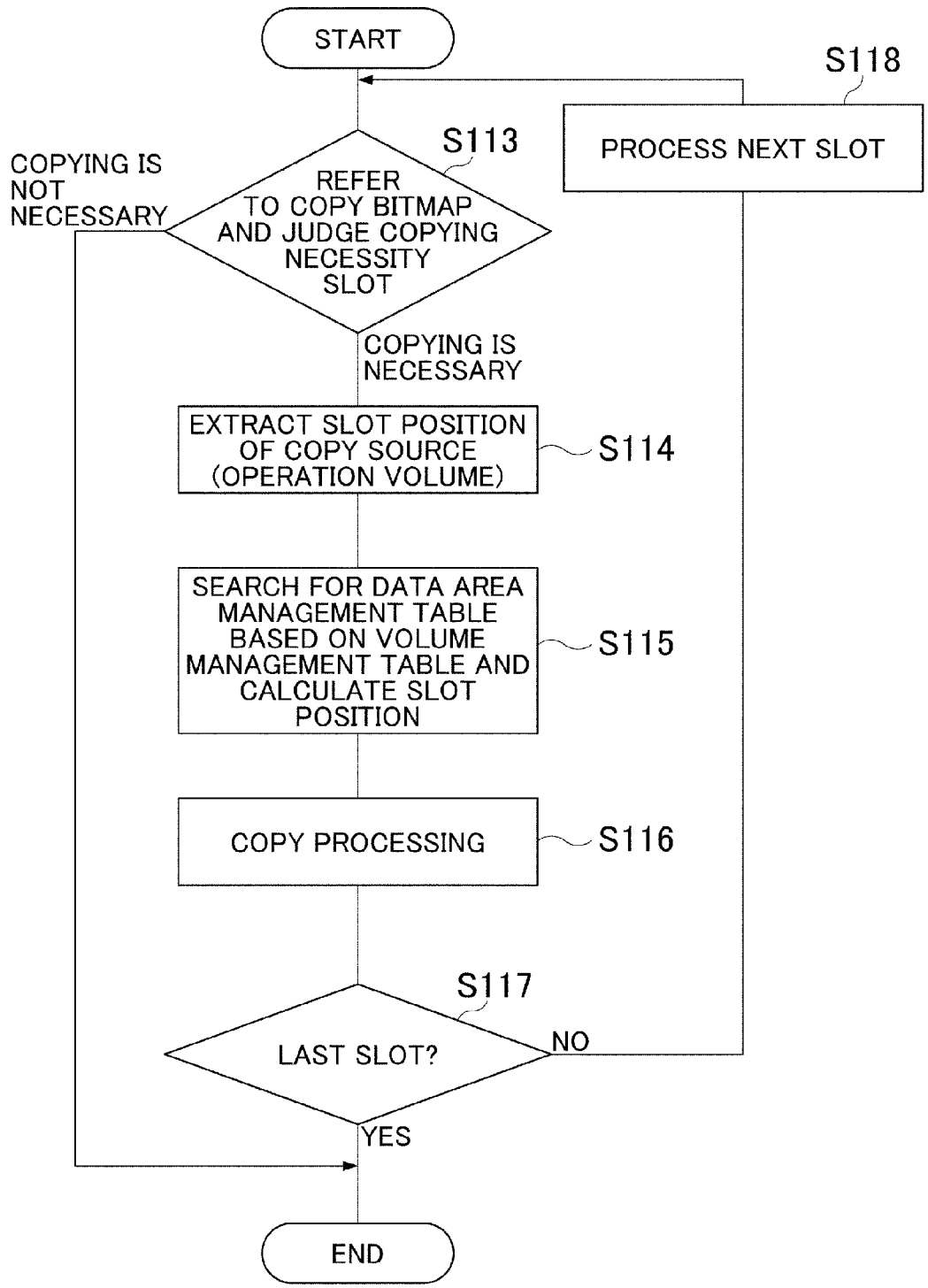
FIG. 26 is a flowchart showing background copy processing.

FIG. 26 shows a processing procedure of copy processing executed by the controller 10 for the storage apparatus 4 by starting a copy job when performing background copying to pages secured as triggered by the write processing on the operation volume 30.

The controller 10 starts the copy job, refers to the second copy necessity flag field 132B of the copy bitmap 132 by the started copy job, and judges the necessity of copying in slot units (S113).

If it is determined as a result of this judgment that copying is necessary, the controller 10 extracts the slot position in the operation volume 30 which is a copy source (S114).

Next, the controller 10 searches the volume management table 131A for the data area management table 131C and calculates a slot position in the duplicated volume 40 which is a copy destination (S115).

Then, the controller 10 copies data stored in the slot position extracted in step S114 to the slot position calculated in step S115 (S116).

Subsequently, the controller 10 judges whether the slot on which the copy processing was executed is the last slot or not (S117).

If a negative judgment result is obtained in this step, the controller 10 determines that other slots on which the copy processing should be executed exist; and processes the next slot (S118). On the other hand, if an affirmative judgment result is obtained in this step, the controller 10 terminates this processing.

On the other hand, if it is determined as a result of the judgment in step S113 that copying is not necessary, the controller 10 judges whether the target slot is the last slot or not (S117). Then, as explained above, if a negative judgment result is obtained in this step, the controller 10 proceeds to step S118 and executes the processing on the next slot; and if an affirmative judgment result is obtained in this step, the controller 10 terminates this processing.

Figure 27:
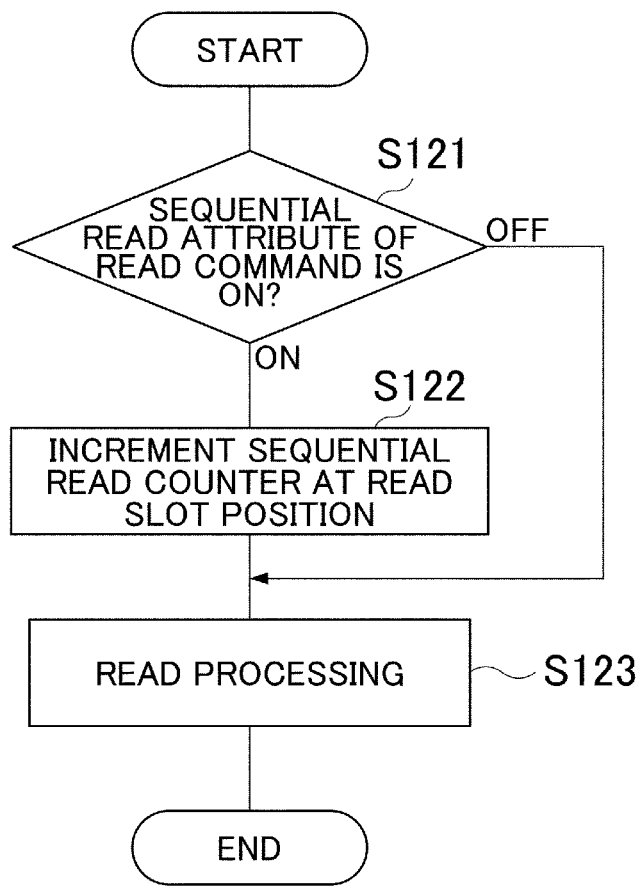
FIG. 27 is a flowchart showing sequential read processing.

FIG. 27 shows a processing procedure of update processing on the sequential read counter as executed by the controller 10 for the storage apparatus 4. The controller 10 starts the update processing as shown in this FIG. 27 after receiving a read request from the host system 2.

After receiving a read request from the host system 2, the controller 10 judges whether the sequential read attribute included in a read command of the read request is ON or not (S121).

If it is determined as a result of this judgment that the sequential read attribute is OFF, the controller 10 determines that this read request is not for sequential data reading, executes normal read processing (S123), and terminates this processing.

On the other hand, if it is determined as a result of the judgment in step S121 that the sequential read attribute is ON, the controller 10 determines that this read request is for sequential data reading; and increments the counter of the slot position, which is a read target of the sequential read counter 133, by one (S122).

Then, the controller 10 executes sequential data reading (S123) and terminates this processing.

Figure 28:
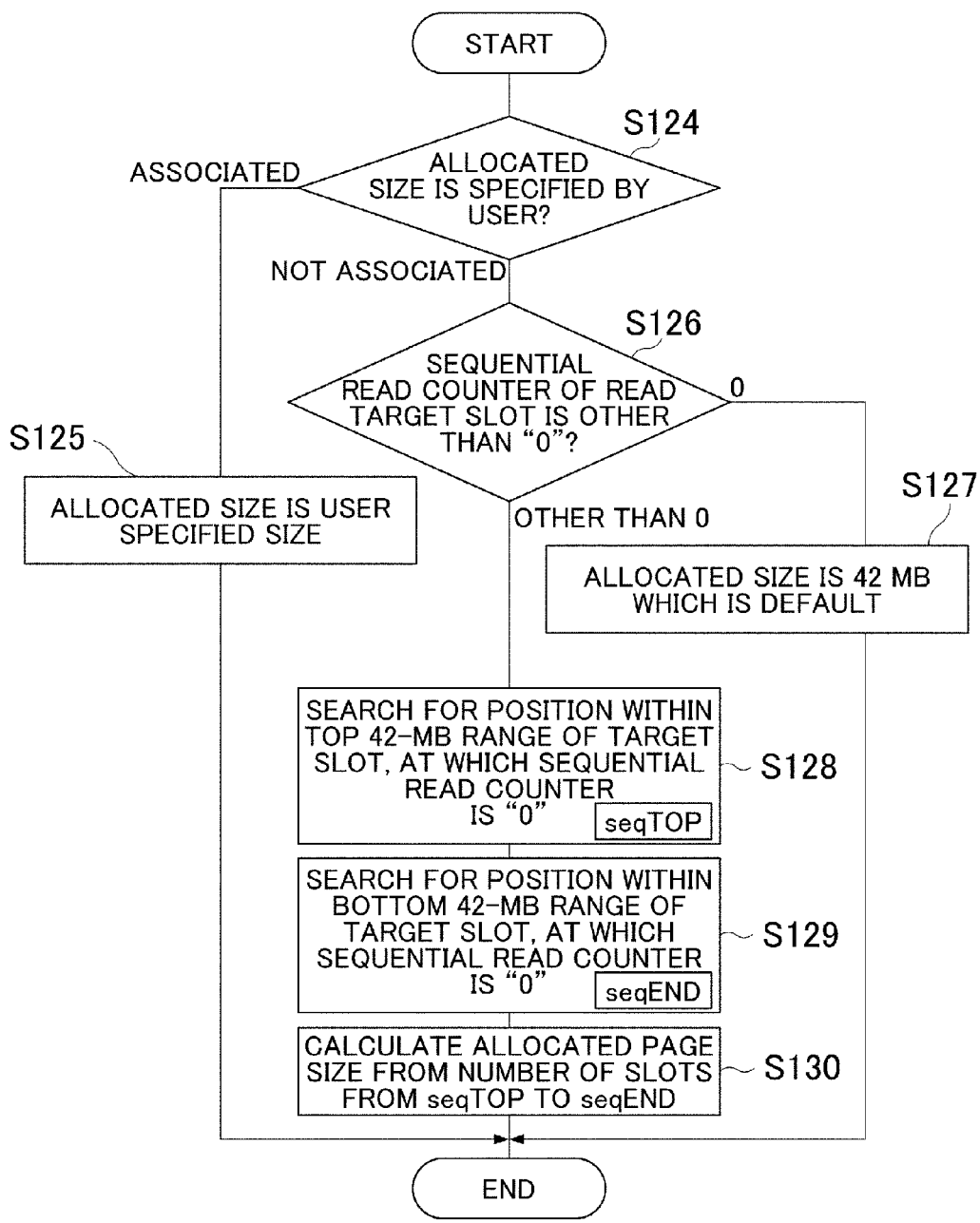
FIG. 28 is a flowchart showing sequential read processing.

FIG. 28 shows a processing procedure of page size determination processing executed by the controller 10 for the storage apparatus 4 when determining the page size of pages secured as triggered by the write processing on the operation volume 30.

The controller 10 judges whether the page size of pages to be allocated is specified by the user via the external terminal 17 or not (S124).

If it is determined as a result of this judgment that the page size is specified by the user, the controller 10 determines the user-specified size to be the page size of the allocated pages (S125) and terminates this processing.

On the other hand, if it is determined as a result of the judgment in step S124 that the page size is not specified by the user, the controller 10 refers to the sequential read counter 133 and judges whether the counter of the read target slot is other than "0" or not (S126).

If it is determined as a result of this judgment that the counter is "0," the controller 10 determines that sequential data reading has not been performed for the read target slot so far; determines the allocated size to be 42 MB which is a default value (S127); and terminates this processing.

On the other hand, if it is determined as a result of the judgment in step S126 that the counter is other than "0," the controller 10 determines that sequential data reading has been performed for the read target slot at least once; and searches for a position within the top 42-MB range of this read target slot at which the counter is "0" in the sequential read counter 133 (S128).

Meanwhile, the controller 10 searches for a position within the bottom 42-MB range of this read target slot at which the counter is "0" in the sequential read counter 133 (S129).

Then, the controller 10 calculates the page size of the pages to be allocated from the number of slots from the top position found by the search in step S128 to the end position found by the search in step S129 (S130), and terminates this processing.

Figure 29:
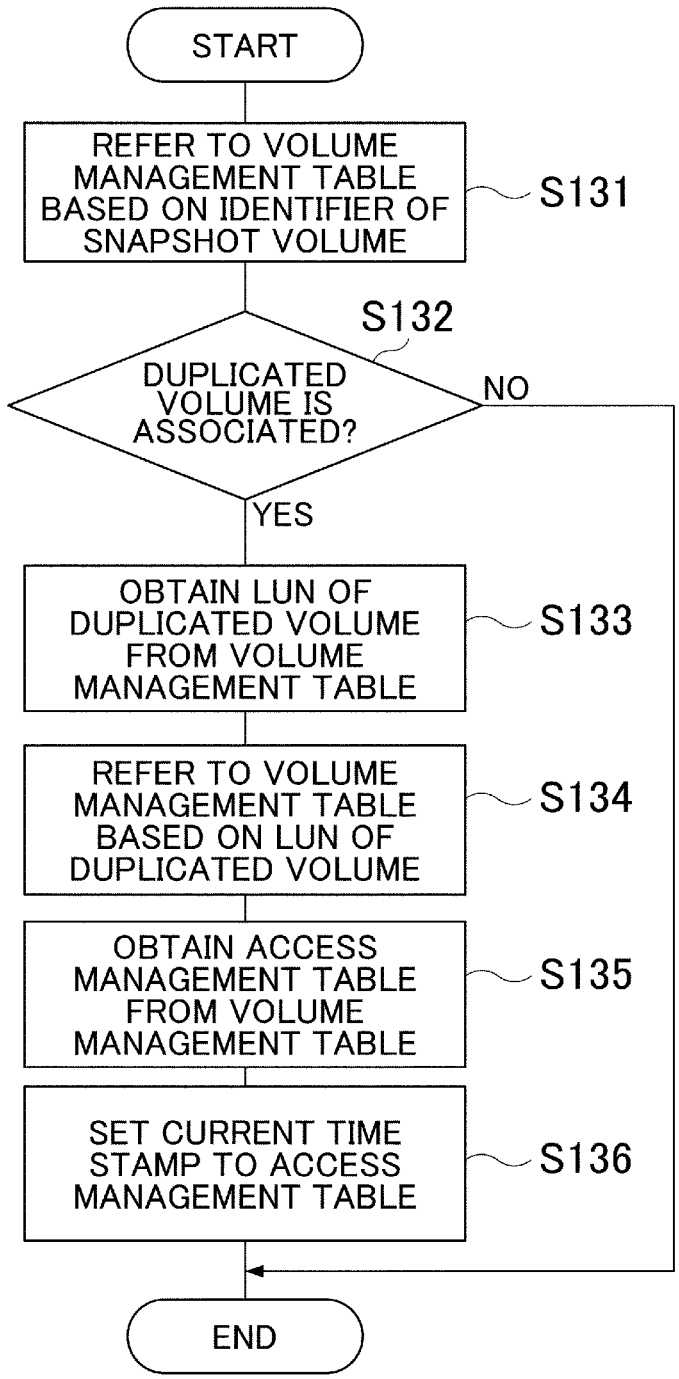
FIG. 29 is a flowchart showing a processing procedure of access frequency management.

FIG. 29 shows a processing procedure of access frequency management processing executed by the controller 10 for the storage apparatus 4 when a read request or a write request for the snapshot volume 50 is made.

The controller 10 refers to the "LUN of Duplicated Volume" in the area for managing the snapshot volume 50 in the volume management table 131A (S131).

Next, the controller 10 refers to the "LUN of Duplicated Volume" and judges whether or not the snapshot volume 50 and the duplicated volume 40 are associated with each other or not, based on whether the identifier of the duplicated volume is stored or not (S132).

If a negative judgment result is obtained in this step, the controller 10 determines that the snapshot volume 50 and the duplicated volume 40 are not associated with each other; and terminates this processing.

On the other hand, if an affirmative judgment result is obtained in step S132, the controller 10 determines that the snapshot volume 50 and the duplicated volume 40 are associated with each other; and obtains the "LUN of Duplicated Volume" (S133).

Then, the controller 10 refers to the area for managing the duplicated volume 40 in the volume management table 131A based on the identifier of the duplicated volume 40 (S134).

Furthermore, the controller 10 obtains the access management table 134 from the area for managing the duplicated volume 40 (S135).

Furthermore, with the access management table 134, the controller 10 sets a current time stamp at a slot position corresponding to the read target slot or the write target slot (S136) and terminates this processing.

Figure 30:
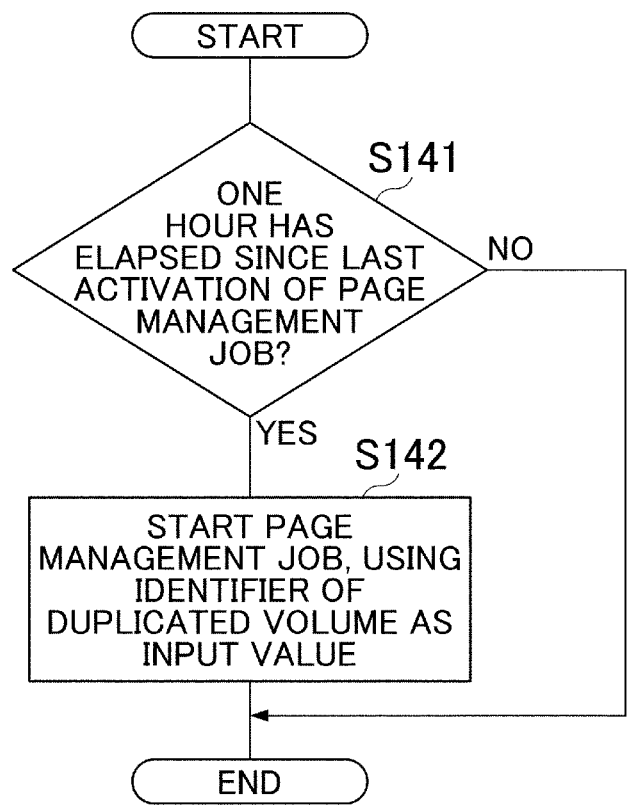
FIG. 30 is a flowchart showing a processing procedure of monitor processing executed by the controller 10 for the storage apparatus 4 by starting a monitor job.

FIG. 30 shows a processing procedure of monitor processing executed by the controller 10 for the storage apparatus 4 by starting a monitor job.

The controller 10 regularly starts the monitor job and judges whether an hour has elapsed or not since the activation of the last page management job by the started monitor job (S141).

If an affirmative judgment result is obtained in this step, the controller 10 starts the page management job, using the identifier of the duplicated volume 40 as an input value (S142) and terminates this processing. On the other hand, if a negative judgment result is obtained in this step, the controller 10 terminates this processing.

Figure 31:
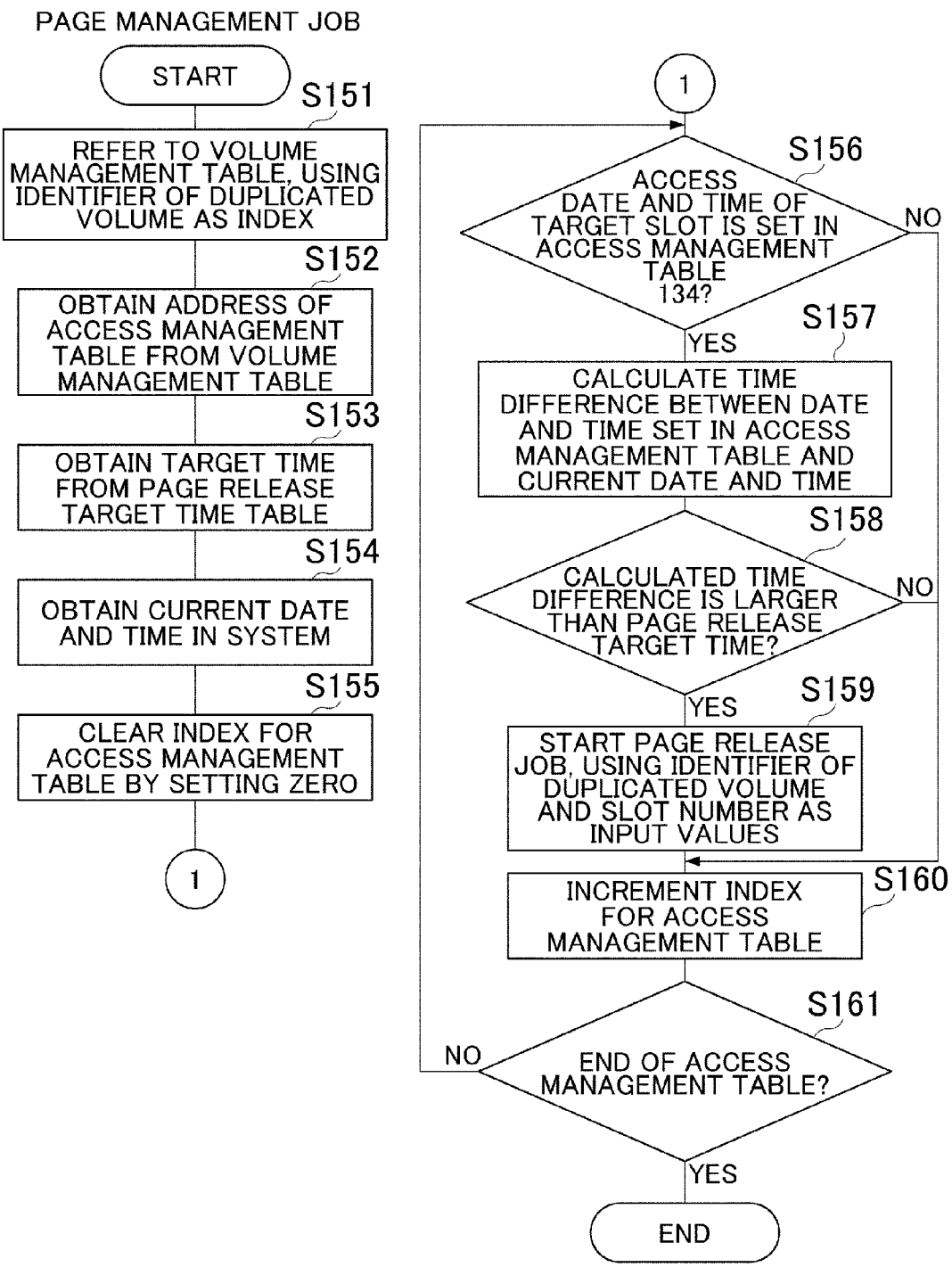
FIG. 31 is a flowchart showing page release processing.

FIG. 31 shows a processing procedure of the page release processing executed by the controller 10 for the storage apparatus 4 by starting a page management job when releasing pages based on the access frequency after securing the pages.

The controller 10 starts the page management job and refers to the area for managing the duplicated volume 40 in the volume management table 131A based on the identifier of the duplicated volume 40 (S151).

Next, the controller 10 obtains an address of the access management table 134 from the area for managing the duplicated volume 40 in the volume management table 131A (S152).

Then, the controller 10 obtains page release time which is input via the external terminal 17 (S153).

Next, the controller 10 obtains the current date and time in the storage system 1 (S154).

Next, the controller 10 clears the index for the access management table 134 by setting zero (S155).

Furthermore, the controller 10 judges whether the access date and time of the target slot is set in the access management table 134 or not (S156).

If an affirmative judgment result is obtained in this step, the controller 10 calculates the difference between the date and time, which is set, and the current date and time (S157).

Furthermore, the controller 10 judges whether the calculated time difference is larger than the page release target time or not (S158).

If an affirmative judgment result is obtained in this step, the controller 10 determines that the target slot has been secured without being accessed for a longer period of time than the page release target time; and starts a page release job, using the identifier of the duplicated volume 40 and the slot number as input values (S159).

Then, the controller 10 increments the index for the access management table 134 by one (S160).

Subsequently, the controller 10 judges whether the incremented index is at the end of the access management table 134 or not (S161).

If an affirmative judgment result is obtained in this step, the controller 10 terminates this processing. On the other hand, if a negative judgment result is obtained in this step, the controller 10 proceeds to step S156 and executes the above-described processing (from S156 to S161) in order to judge whether other target slots for which pages should be released exist or not, based on the access frequency.

If a negative judgment result is obtained in step S156, the controller 10 determines that the access date and time of the target slot is not set in the access management table 134; and proceeds to step S160. Then, the controller 10 executes the above-described processing (S160). If the incremented index is at the end of the access management table the controller 10 terminates this processing (S161).

If a negative judgment result is obtained in step S158, the controller 10 determines that the difference between the date and time set in the access management table 134 and the current date and time is smaller than the page release target time; and proceeds to step S160. Then, the controller 10 executes the above-described processing (S160); and if the incremented index is at the end of the access management table, the controller 10 terminates this processing (S161).

Figure 32:
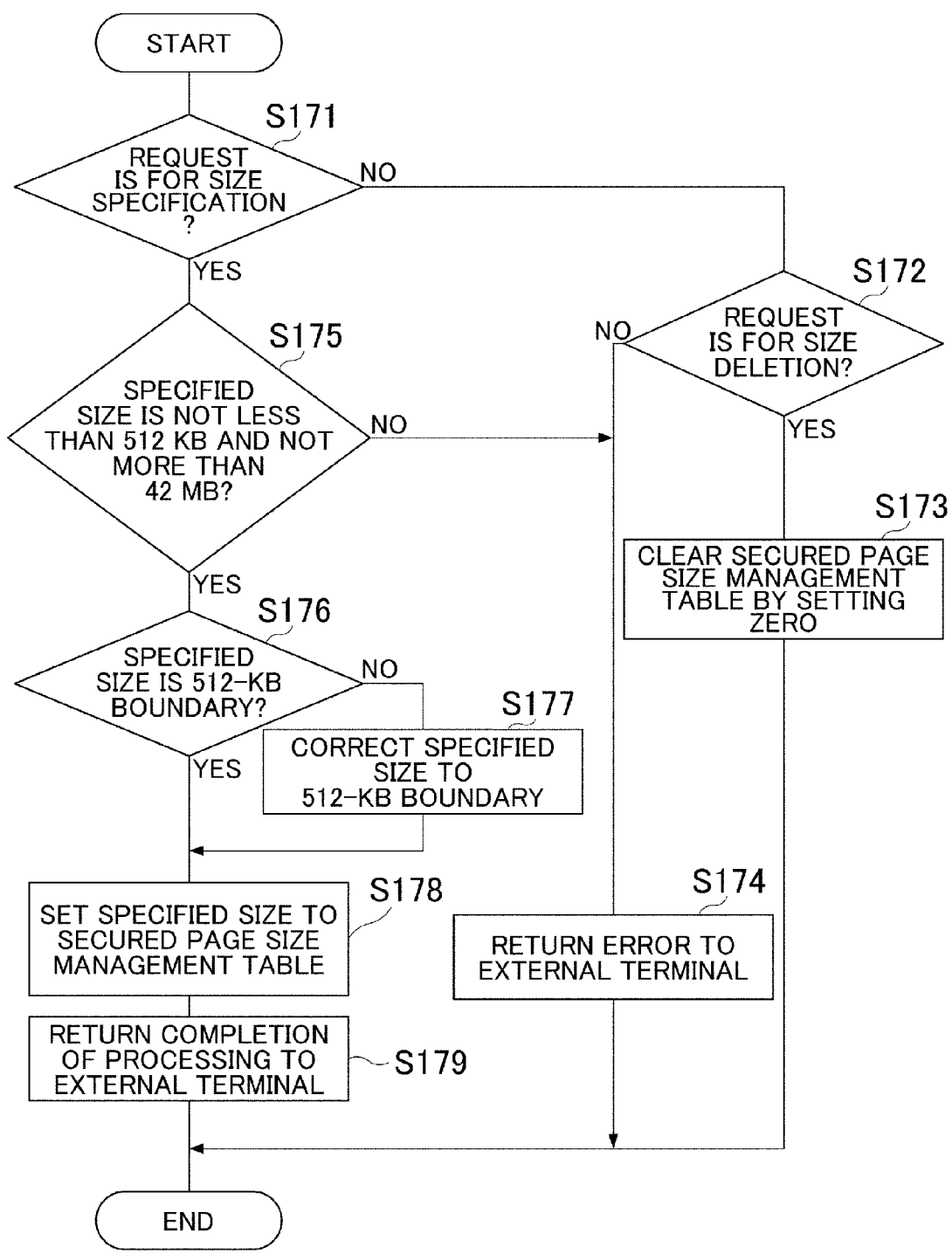
FIG. 32 is a flowchart showing secured page size specification processing from the external terminal.

FIG. 32 shows a processing procedure of processing for determining the page size of the secured pages as executed by the controller 10 for the storage apparatus 4 when the page size of the secured pages is specified by the user via the external terminal 17.

After receiving whatever request from the user via the external terminal 17, the controller 10 judges whether the accepted request is for size specification or not (S171).

If a negative judgment result is obtained in this step, the controller 10 further judges whether the request accepted from the user is for size deletion or not (S172).

Then, if an affirmative judgment result is obtained in this step, the controller 10 determines that the accepted request is for size deletion; and clears the secured page size management table for managing the secured page size by setting zero (S173).

On the other hand, if a negative judgment result is obtained in step S172, the controller 10 reports an error to the external terminal 17 (S174) and terminates this processing.

Furthermore, if an affirmative judgment result is obtained in step S171, the controller 10 determines that the request accepted from the user is for size specification; and judges whether or not the specified size is not less than 512 KB, which is equivalent to two slots, and not more than 42 MB (S175).

If a negative judgment result is obtained in this step, the controller 10 proceeds to step S174, reports an error to the external terminal 17 as explained above (S174), and terminates this processing.

On the other hand, if an affirmative judgment result is obtained in step S175, the controller 10 judges whether the specified size is a 512-KB boundary or not (S176).

If a negative judgment result is obtained in this step, the controller 10 corrects the specified size to the 512-KB boundary (S177) and proceeds to step S178. On the other hand, if an affirmative judgment result is obtained in this step, the controller 10 proceeds to step S178.

Then, the controller 10 sets the specified size to the secured page size management table (S178).

Subsequently, the controller 10 reports the completion of the processing to the external terminal 17 (S179) and terminates this processing.

(10) Effects of This Embodiment

According to this embodiment as explained above, when allocating pages to the duplicated volume 40, pages can be allocated in stripe units, each of which is of a data size that can be read by one read command, to the storage device 20. Therefore, data can be read from the storage device 20 by a small number of read commands and the sequential performance can be improved.

INDUSTRIAL APPLICABILITY

The present invention can be applied to a wide variety of storage apparatuses equipped with the snapshot function.

REFERENCE SIGN LIST

1 Storage system
2 Host apparatus
3 Network

4 Storage apparatus
10 Controller
11 Channel adapter
12 Connection unit
13 Shared memory
14 Cache memory
15 Disk adapter
16 Management terminal
17 External terminal
20 Storage device
21 Disk device
30 Operation volume
40 Duplicated volume
50 Snapshot volume

The invention claimed is:

1. A storage apparatus, comprising:
a controller connected to a host system; and
a storage device connected to the controller;
wherein the storage device is configured to provide a page, which is an actual storage area, to a logical volume created in the controller, a duplicated volume which is created in the controller and is a duplicate of the to logical volume, and a snapshot volume created in the controller for storing data to be saved by a snapshot,
wherein the controller is configured to provide the logical volume, the duplicated volume, and the snapshot volume to the host system,
wherein when allocating the page provided by the storage device to the duplicated volume, the controller is configured to allocate the page in a stripe unit of a data size that can be read by one read command, to the storage device,
wherein the controller is configured to allocate the page in the stripe unit to the duplicated volume based on a mapping table for associating a position of a storage area in the duplicated volume with a position of a storage area in the storage device,
wherein the mapping table is constituted from a volume management table, a volume area management table, and a data area management table; and
wherein the controller is configured to:
manage the logical volume, the duplicated volume, and the snapshot volume by associating them with each other based on the volume management table;
manage a storage area in the duplicated volume in a slot unit, which is a minimum storage area for storing data, based on the volume area management table; and
manage a storage area in the duplicated volume in a stripe unit based on the data area management table.

2. The storage apparatus according to claim 1, wherein when a sequential read request is made from the host system to the snapshot volume, the controller is configured to record the number of times of sequential data reading in a slot unit which is a minimum storage area for storing data; and
when a write request is made to the logical volume, the controller is configured to determine a page range to be allocated to the duplicated volume based on the recorded number of times of sequential data reading.

3. The storage apparatus according to claim 1, wherein when a new write request is made from the host system to the logical volume, the controller is configured to write data based on the new write request to the logical volume, allocate a page in a stripe unit to the duplicated volume, and write the data based on the new write request to the allocated page.

4. The storage apparatus according to claim 1, wherein when a read request is made from the host system to the snapshot volume, the controller is configured to read data based on the read request from the logical volume or the duplicated volume.

5. The storage apparatus according to claim 1, wherein when a write request is made from the host system to the snapshot volume, the controller is configured to save data, which is before being updated in response to the write request, from the logical volume or the duplicated volume to a real volume associated with the snapshot volume.

6. The storage apparatus according to claim 1, wherein when an access request is made from the host system to the snapshot volume, the controller is configured to record an access date and time in a slot unit; and
when a difference between the access date and time and a current date and time exceeds predetermined page release target time, the controller is configured to release a page including a slot exceeding the page release target time from the duplicated volume.

7. A storage apparatus control method for controlling a storage apparatus including a controller connected to a host system and a storage device connected to the controller,
the storage apparatus control method comprising:
in a first step, providing, by the storage device, a page, which is an actual storage area, to a logical volume created in the controller, a duplicated volume which is created in the controller and is a duplicate of the logical volume and a snapshot volume created in the controller for storing data to be saved by a snapshot;
in a second step, providing, by the controller, the logical volume, the duplicated volume, and the snapshot volume to the host system;
in a third step, allocating, by the controller, the page in a stripe unit of a data size that can be read by one read command, to the storage device, when allocating the page provided by the storage device to the duplicated volume;
in the third step, allocating, by the controller, the page in the stripe unit to the duplicated volume based on a mapping table for associating a position of a storage area in the duplicated volume with a position of a storage area in the storage device;
wherein the mapping table is constituted from a volume management table, a volume area management table, and a data area management table; and
wherein the third step comprises:
managing, by the controller, the logical volume, the duplicated volume, and the snapshot volume by associating them with each other based on the volume management table;
managing, by the controller, a storage area in the duplicated volume in a slot unit based on the volume area management table; and
managing, by the controller, a storage area in the duplicated volume in a stripe unit based on the data area management table.

8. The storage apparatus control method according to claim 7, further comprising:
in a fourth step, when a sequential read request is made from the host system to the snapshot volume, recording, by the controller, the number of times of sequential data reading in a slot unit which is a minimum storage area for storing data; and
determining a page range to be allocated to the duplicated volume based on the recorded number of times of sequential data reading when a write request is made to the logical volume.

9. The storage apparatus control method according to claim 7, further comprising:
- in a fifth step, when a new write request is made from the host system to the logical volume, writing, by the controller, data based on the new write request to the logical volume,
- allocating a page in a stripe unit to the duplicated volume, and
- writing the data based on the new write request to the allocated page.

10. The storage apparatus control method according to claim 7, further comprising:
- in a sixth step, when a read request is made from the host system to the snapshot volume, reading, by the controller, data based on the read request from the logical volume or the duplicated volume.

11. The storage apparatus control method according to claim 7, further comprising:
- in a seventh step, when a write request is made from the host system to the snapshot volume, saving, by the controller, data, which is before being updated in response to the write request, from the logical volume or the duplicated volume to a real volume associated with the snapshot volume.

* * * * *